(12) United States Patent
Rekken et al.

(10) Patent No.: US 11,760,839 B2
(45) Date of Patent: Sep. 19, 2023

(54) PROCESSES FOR MAKING POLYSILOXAZANES AND USING SAME FOR PRODUCING AMINO-FUNCTIONAL POLYORGANOSILOXANES

(71) Applicant: Dow Silicones Corporation, Midland, MI (US)

(72) Inventors: Brian Rekken, Midland, MI (US); Patrick Fryfogle, Midland, MI (US); Nisaraporn Suthiwangcharoen, Midland, MI (US); Brett Zimmerman, Midland, MI (US); Hannah Furnier, Midland, MI (US); Kimmai Nguyen, Midland, MI (US); Sean Reisch, Horseheads, NY (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/642,730

(22) PCT Filed: Oct. 29, 2020

(86) PCT No.: PCT/US2020/057836
§ 371 (c)(1),
(2) Date: Mar. 14, 2022

(87) PCT Pub. No.: WO2021/108068
PCT Pub. Date: Jun. 3, 2021

(65) Prior Publication Data
US 2022/0332899 A1    Oct. 20, 2022

Related U.S. Application Data

(60) Provisional application No. 62/940,414, filed on Nov. 26, 2019.

(51) Int. Cl.
*C08G 77/08* (2006.01)
*C08G 77/388* (2006.01)
*C07F 7/18* (2006.01)
*C08G 77/58* (2006.01)

(52) U.S. Cl.
CPC .......... *C08G 77/388* (2013.01); *C07F 7/1888* (2013.01); *C07F 7/1892* (2013.01); *C08G 77/58* (2013.01)

(58) Field of Classification Search
CPC ....... C08G 77/08; C08G 77/54; C08G 77/388
See application file for complete search history.

(56) References Cited

U.S. PATENT DOCUMENTS

| | | |
|---|---|---|
| 3,146,250 A | 8/1964 | Speier et al. |
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,989,668 A | 11/1976 | Lee et al. |
| 4,766,176 A | 8/1988 | Lee et al. |
| 4,784,879 A | 11/1988 | Lee et al. |
| 5,017,654 A | 5/1991 | Togashi et al. |
| 5,026,890 A * | 6/1991 | Webb .................. C08G 77/388 556/408 |
| 5,036,117 A | 7/1991 | Chung et al. |
| 5,175,325 A | 12/1992 | Brown et al. |
| 5,389,364 A | 2/1995 | Cifuentes et al. |
| 5,409,695 A | 4/1995 | Abrutyn et al. |
| 5,419,627 A | 5/1995 | Oldinski |
| 5,504,149 A | 4/1996 | Kosal |
| 5,892,084 A * | 4/1999 | Janeiro .................. C07F 7/0879 556/425 |
| 5,919,441 A | 7/1999 | Mendolia et al. |
| 5,981,680 A | 11/1999 | Petroff et al. |
| 6,051,216 A | 4/2000 | Barr et al. |
| 6,177,583 B1 * | 1/2001 | Marzinke ............. C08G 77/388 556/425 |
| 6,590,117 B1 * | 7/2003 | Westmeyer ........... C07F 7/1876 556/479 |
| 6,916,464 B2 | 7/2005 | Hansenne et al. |
| 6,916,467 B2 | 7/2005 | Devin-Baudoin et al. |
| 6,953,484 B2 | 10/2005 | Devin-Baudoin et al. |
| 7,238,768 B2 | 7/2007 | Hupfield et al. |
| 7,335,236 B2 | 2/2008 | McKelvey |
| 7,351,847 B2 | 4/2008 | Nguyen |
| 7,456,308 B2 | 11/2008 | Nguyen et al. |
| 7,879,316 B2 | 2/2011 | Ferrari et al. |
| 7,887,786 B2 | 2/2011 | Tournilhac et al. |
| 8,669,388 B2 | 3/2014 | Selbertinger et al. |
| 8,728,500 B2 | 5/2014 | McDermott et al. |
| 8,877,293 B2 | 11/2014 | Evans et al. |
| 9,593,209 B2 | 3/2017 | Dent et al. |
| 2003/0072730 A1 | 4/2003 | Tournilhac |
| 2003/0126692 A1 | 7/2003 | Devin-Baudoin et al. |
| 2003/0147840 A1 | 8/2003 | Legrand et al. |
| 2003/0152534 A1 | 8/2003 | Legrand et al. |
| 2003/0170188 A1 | 9/2003 | Ferrari et al. |
| 2003/0235553 A1 | 12/2003 | Lu et al. |

(Continued)

FOREIGN PATENT DOCUMENTS

| | | |
|---|---|---|
| EP | 342518 A2 | 11/1989 |
| EP | 0347895 B | 11/1993 |

(Continued)

OTHER PUBLICATIONS

Search Report from corresponding Chinese Application No. 202080076588.2 dated Mar. 21, 2023.

(Continued)

*Primary Examiner* — Margaret G Moore
(74) *Attorney, Agent, or Firm* — Catherine Brown

(57) ABSTRACT

A process for preparing a cyclic polysiloxazane is disclosed. The cyclic polysiloxazane may optionally be converted to an a-alkoxy-ou-amino-functional polysiloxane. The cyclic polysiloxazane or the a-alkoxy-oo-amino-functional polysiloxane, may be used as a capping agent for a silanol-functional polyorganosiloxane in a process to make an amino-functional polyorganosiloxane.

21 Claims, No Drawings

(56) References Cited

U.S. PATENT DOCUMENTS

| | | |
|---|---|---|
| 2004/0045098 A1 | 3/2004 | Lazzeri |
| 2004/0180032 A1 | 9/2004 | Manelski et al. |
| 2008/0282482 A1 | 11/2008 | Audousset et al. |
| 2010/0098648 A1 | 4/2010 | Yu |
| 2015/0141648 A1 | 5/2015 | Diao et al. |
| 2016/0177037 A1* | 6/2016 | Huggins ............ C08G 77/10 556/425 |

FOREIGN PATENT DOCUMENTS

| | | |
|---|---|---|
| EP | 0745871 A2 | 12/1996 |
| EP | 1266647 A1 | 12/2002 |
| EP | 1266648 A1 | 12/2002 |
| EP | 1266653 A1 | 12/2002 |
| EP | 2765165 A1 | 8/2014 |
| JP | 11209384 A | 8/1999 |
| JP | 2002255975 A | 9/2002 |
| WO | 2003105789 A1 | 12/2003 |
| WO | 2003105801 A1 | 12/2003 |
| WO | 2003106614 A2 | 12/2003 |
| WO | 2004000247 A1 | 12/2003 |
| WO | 2004054523 A1 | 7/2004 |
| WO | 2004054524 A1 | 7/2004 |
| WO | 2004060101 A2 | 7/2004 |
| WO | 2015077306 A1 | 5/2015 |
| WO | 2021-108067 * | 6/2021 |

OTHER PUBLICATIONS

Gatineau, "N-Heterocyclic carbene-initiated hydrosilylation of styryl alcohols with dihydrosilanes: a mechanistic nvestigation", Dalton Transactions, 2013, vol. 42, No. 20.

Smith, The Analytical Chemistry of Silicones, vol. 112 in Chemical Analysis, John Wiley & Sons, Inc., 1991, chapter 12, pp. 347-417, and section 5.5.3.1.

\* cited by examiner

PROCESSES FOR MAKING POLYSILOXAZANES AND USING SAME FOR PRODUCING AMINO-FUNCTIONAL POLYORGANOSILOXANES

CROSS REFERENCE TO RELATED APPLICATIONS

This application is a U.S. national stage filing under 35 U.S.C. § 371 of PCT Application No. PCT/US20/057836 filed on 29 Oct. 2020, currently pending, which claims the benefit of U.S. Provisional Patent Application No. 62/940,414 filed 26 Nov. 2019 under 35 U.S.C. § 119 (e). PCT Application No. PCT/US20/057836 and U.S. Provisional Patent Application No. 62/940,414 are each hereby incorporated by reference.

TECHNICAL FIELD

An improved process for preparing a cyclic polysiloxazane via a hydrosilylation reaction of an allyl-functional amine and a SiH terminated siloxane oligomer employs a hydrosilylation reaction promoter. The cyclic polysiloxazane is useful for capping silanol groups in silanol-functional polyorganosiloxanes. The cyclic polysiloxazane, and/or an α-alkoxy-ω-amino-functional polysiloxane prepared therefrom, can be used for preparing amino-functional polyorganosiloxanes.

BACKGROUND

Amino-functional polyorganosiloxanes, such as amine-terminated polydiorganosiloxanes are useful in personal care applications, such as hair care. Amine-terminated polydiorganosiloxanes may be useful, for example, in hair conditioning applications. Amine-terminated polydiorganosiloxanes made by condensation may suffer from the drawback of instability as shown by viscosity changes and/or development of an ammonia odor after aging, which is undesirable for personal care applications. Traditionally, primary amine terminated polyorganosiloxanes are expensive to make by equilibration as they require costly starting materials and catalysts and require multiple process steps to complete.

Another method for making amine-terminated polyorganosiloxanes uses allylamine- or a derivative that hydrolyzes into allylamine. These are used to do hydrosilylation chemistry with SiH terminated polymers to form the amine-terminated polyorganosiloxanes; however, this method suffers from the drawback that the amine-terminated polyorganosiloxane product may contain at least trace amounts of either SiH or allylamine, either of which would have to be removed before the product can be used in any personal care applications.

Another method of making amine-terminated polyorganosiloxanes is by ammonolysis of chloropropyl terminated siloxanes. This costly, multi-step method may suffer from the drawback of leaving residual salt (i.e., ammonium chloride) in the amine-terminated polyorganosiloxane product that may require extensive washing to remove, which is cost ineffective and poorly sustainable. Also, any residual ammonium chloride may produce a foul smell, which is undesirable for personal care applications.

Problem to be Solved

A new process for making amino-functional polyorganosiloxanes that minimizes or eliminates one or more of the above drawbacks is desired.

SUMMARY

A process for preparing a cyclic polysiloxazane comprises hydrosilylation reaction of an allyl-functional amine and an SiH-terminated siloxane oligomer in the presence of a hydrosilylation reaction catalyst and a hydrosilylation reaction promoter. The cyclic polysiloxazane can be used as a capping agent for silanol-functional silanes and/or polyorganosiloxanes to make amino-functional silanes and/or polyorganosiloxanes.

DETAILED DESCRIPTION

Part I. Synthesis of Cyclic Polysiloxazanes

A process for preparing a cyclic polysiloxazane comprises:

1) combining starting materials comprising a) an allyl-functional amine, b) a platinum catalyst capable of catalyzing hydrosilylation reaction, c) a hydrosilylation reaction promoter (hydrocarbyloxy-functional di-hydrocarbylsilane) of formula

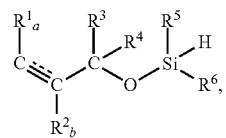

where $\equiv\equiv\equiv\equiv\equiv$ represents a bond selected from the group consisting of a double bond and a triple bond, subscript a is 1 or 2, subscript b is 0 or 1, with the provisos that when $\equiv\equiv\equiv\equiv\equiv$ is a double bond, then a=2 and b=1, and when $\equiv\equiv\equiv\equiv\equiv$ is a triple bond, then a=1 and b=0; each $R^1$ is independently selected from the group consisting of hydrogen, an alkyl group of 1 to 15 carbon atoms, and an aryl group of 6 to 20 carbon atoms; $R^2$ is selected from the group consisting of hydrogen, an alkyl group of 1 to 15 carbon atoms, and an aryl group of 6 to 20 carbon atoms; $R^3$ is selected from the group consisting of hydrogen, an alkyl group of 1 to 15 carbon atoms, and an aryl group of 6 to 20 carbon atoms; $R^4$ is selected from the group consisting of hydrogen, an alkyl group of 1 to 15 carbon atoms, and an aryl group of 6 to 20 carbon atoms; $R^5$ is an independently selected monovalent hydrocarbon group of 1 to 15 carbon atoms; and R⁶ is an independently selected monovalent hydrocarbon group of 1 to 15 carbon atoms;
thereby forming a reaction mixture, and thereafter
2) adding to the reaction mixture:
d) an SiH-terminated siloxane oligomer of formula

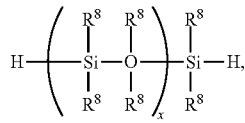

where each R⁸ is an independently selected monovalent hydrocarbon group of 1 to 18 carbon atoms and subscript x is 1 or 2; thereby preparing the cyclic polysiloxazane.

Starting Material a) Allyl-Functional Amine

Starting material a) in the process for making the cyclic polysiloxazane is an allyl-functional amine. The allyl-functional amine may have formula:

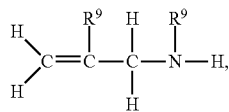

where each R⁹ is independently selected from the group consisting of hydrogen and an alkyl group of 1 to 15 carbon atoms, alternatively 1 to 12 carbon atoms, and alternatively 1 to 6 carbon atoms. Suitable alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. Alternatively, each alkyl group for R⁹ may be methyl. Alternatively, each R⁹ may be a hydrogen atom. Alternatively, at least one R⁹ per molecule may be an alkyl group such as methyl. Without wishing to be bound by theory, it is thought that the cyclic polysiloxazane may be used as a capping agent for silanol functional silanes and polyorganosiloxanes to make primary amine-functional silanes and polyorganosiloxanes when each R⁹ is a hydrogen atom.

Allyl-functional amines are known in the art and are commercially available. For example, allylamine of formula CH₂=CH—CH₂NH₂, N-allyl-methylamine, N-allylcyclopentylamine, 2-methyl-allylamine, and allylcyclohexylamine are commercially available from Millipore Sigma of St. Louis, Mo., USA. Alternatively, the allyl-functional amine may be allylamine.

Starting Material b) Platinum Catalyst

Starting material b) in the process for making the cyclic polysiloxazane is a platinum catalyst. Platinum catalysts are known in the art and are commercially available. The platinum catalyst may be platinum metal. Alternatively, the platinum catalyst may contain platinum metal. Suitable platinum catalysts include b-i) a compound of platinum metal, which may include chloroplatinic acid (Speier's Catalyst), chloroplatinic acid hexahydrate, and platinum dichloride, Alternatively, starting material b) may comprise b-ii) a complex of the compound for b-i) with a low molecular weight organopolysiloxane or b-iii) a platinum compound microencapsulated in a matrix or coreshell type structure. Complexes of platinum with low molecular weight organopolysiloxanes include 1,3—1,1,3,3-tetramethyl-divinyl-disiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be b-iv) a complex, as described above, microencapsulated in a resin matrix. The platinum catalyst may be suitable for catalyzing hydrosilylation reaction and/or for dehydrogenative coupling of a silicon hydrogen bond, Si—H, from starting material d) and a nitrogen-hydrogen bond, N—H, from starting material a) to generate a silicon nitrogen bond, Si—N, and dihydrogen, H₂. While platinum catalysts are described above, other platinum group metal hydrosilylation reaction catalysts may also be useful. This may involve using a metal selected from rhodium, ruthenium, palladium, osmium, and iridium. Alternatively, a hydrosilylation reaction catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphosphino)ethane]dichlorodirhodium.

Alternatively, starting material b), the hydrosilylation reaction catalyst, may be selected from the group consisting of: i) platinum metal, ii) a compound of platinum, iii) a complex of the compound with an organopolysiloxane, iv) the compound microencapsulated in a matrix or coreshell type structure, v) the complex of the compound microencapsulated in a matrix or coreshell type structure, and vi) a combination of two or more thereof.

Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation.

The amount of catalyst useful herein depends on various factors including the type and amount of other starting materials used in the process, however, the amount of catalyst may be sufficient to provide 10 ppm to 500 ppm Pt based on combined weights of all starting materials used in the process for preparing the cyclic polysiloxazane, alternatively 20 ppm to 100 ppm, and alternatively 35 ppm to 60 ppm on the same basis.

Starting Material c) Hydrosilylation Reaction Promoter

Starting material c) in the process for making the cyclic polysiloxazane is a hydrosilylation reaction promoter. Starting material c) may be a hydrocarbyloxy-functional di-hydrocarbylsilane. The hydrocarbyloxy-functional di-hydrocarbylsilane may have formula:

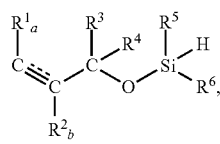

where ≡≡≡≡ represents a bond selected from the group consisting of a double bond and a triple bond, subscript a is 1 or 2, subscript b is 0 or 1, with the provisos that when ≡≡≡≡ is a double bond, then a=2 and b=1, and when ≡≡≡≡ is a triple bond, then a=1 and b=0; each $R^1$ is independently selected from the group consisting of hydrogen, an alkyl group of 1 to 15 carbon atoms, and an aryl group of 6 to 20 carbon atoms; $R^2$ is selected from the group consisting of hydrogen, an alkyl group of 1 to 15 carbon atoms, and an aryl group of 6 to 20 carbon atoms; $R^3$ is selected from the group consisting of hydrogen, an alkyl group of 1 to 15 carbon atoms, and an aryl group of 6 to 20 carbon atoms, and $R^4$ is selected from the group consisting of hydrogen, an alkyl group of 1 to 15 carbon atoms, and an aryl group of 6 to 20 carbon atoms; $R^5$ is an independently selected monovalent hydrocarbon group of 1 to 15 carbon atoms; and $R^6$ is an independently selected monovalent hydrocarbon group of 1 to 15 carbon atoms. Alternatively, at least one of $R^5$ and $R^6$ may be an aryl group. Alternatively, both $R^5$ and $R^6$ are aryl groups.

In the formula above, the alkyl group for $R^1$, $R^2$, $R^3$, $R^4$, $R^5$, and $R^6$ may be as described above for $R^9$. Suitable aryl groups are exemplified by cyclopentadienyl, phenyl, tolyl, xylyl, anthracenyl, benzyl, 1-phenylethyl, 2-phenylethyl, 2,4,6-trimethylphenyl, 2,4,6-triisopropylphenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, the aryl group may be phenyl. Alternatively, $R^1$, $R^2$, and $R^3$ may each be hydrogen. Alternatively, $R^4$ may be selected from the group consisting of hydrogen and methyl.

Alternatively, the bond shown by ≡≡≡≡ may be a double bond, and $R^1$, $R^2$, $R^3$, $R^4$ may each be hydrogen. Alternatively, $R^5$ may be selected from the group consisting of alkyl and aryl, and $R^6$ may be aryl. Alternatively, $R^5$ may be aryl and $R^6$ may be aryl. Alternatively, $R^5$ may be selected from the group consisting of methyl, 2,4,6-trimethylphenyl and 2,4,6-triisopropylphenyl. Alternatively, $R^6$ may be selected from the group consisting of 2,4,6-trimethylphenyl and 2,4,6-triisopropylphenyl.

Alternatively, the bond shown by ≡≡≡≡ may be a triple bond, and $R^1$, $R^2$, and $R^3$ may each be hydrogen. Alternatively, $R^4$ may be selected from the group consisting of hydrogen and alkyl, e.g., methyl. Alternatively, $R^5$ may be selected from the group consisting of alkyl and aryl, and $R^6$ may be aryl. Alternatively, $R^5$ may be aryl and $R^6$ may be aryl. Alternatively, $R^5$ may be selected from the group consisting of methyl, 2,4,6-trimethylphenyl and 2,4,6-triisopropylphenyl. Alternatively, $R^6$ may be selected from the group consisting of 2,4,6-trimethylphenyl and 2,4,6-triisopropylphenyl.

Alternatively, starting material c), the promoter, may be selected from the group consisting of:

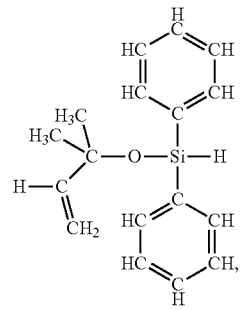

(1,1,-dimethyl-2-propenyl)oxydiphenylsilane

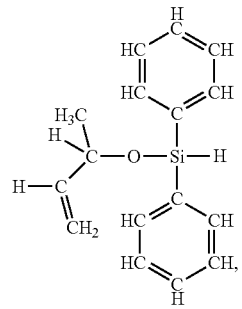

(1-methyl-2-propenyl)oxydiphenylsilane

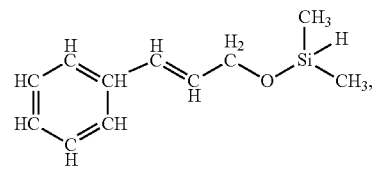

trans-(3-phenyl-2-propenyl)oxy-dimethylsilane

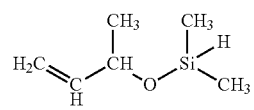

(1-methyl-2-propenyl)oxy-dimethylsilane)

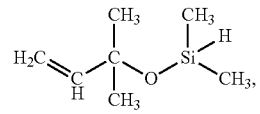

(1,1-dimethyl-2-propenyl)oxy-dimethylsilane)

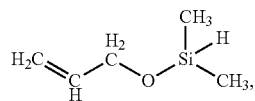

allyloxy-dimethylsilane

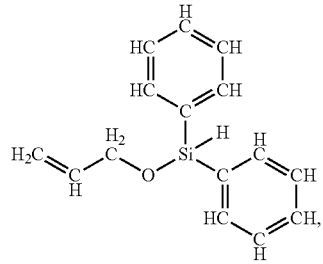

allyloxy-diphenylsilane

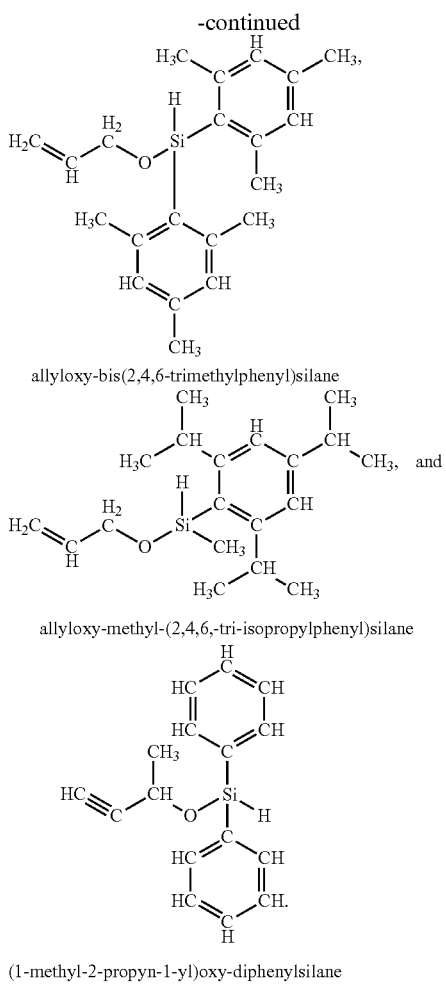

allyloxy-bis(2,4,6-trimethylphenyl)silane allyloxy-methyl-(2,4,6,-tri-isopropylphenyl)silane (1-methyl-2-propyn-1-yl)oxy-diphenylsilane Alternatively, starting material c) may be a hydrocarbyloxy-functional arylsilane, such as (1,1,-dimethyl-2-propenyl)oxydiphenylsilane; (1-methyl-2-propenyl)oxydiphenylsilane; allyloxy-diphenylsilane; allyloxy-bis(2,4,6-trimethylphenyl)silane; allyloxy-methyl-(2,4,6,-tri-isopropylphenyl)silane; and/or (1-methyl-2-propyn-1-yl)oxy-diphenylsilane. Alternatively, starting material c), the promoter, may be selected from the group consisting of allyloxy-bis(2,4,6-trimethylphenyl)silane; allyloxy-methyl-(2,4,6-triisopropylphenyl)silane; and (1-methyl-2-propyn-1-yl)oxy-diphenylsilane.

Suitable promoters of some of the formulas above and methods for their preparation are known, for example, in Japan Patent Publications JP 11209384 (A) and JP 2002255975 (A). Alternatively, promoters for use in the process herein may be synthesized, for example, by a process comprising combining starting materials comprising: an allyl-functional alcohol and an allyl-functional amine to form a mixture, and adding the mixture to an SiH functional halosilane, which may optionally be performed in the presence of a solvent (such as that described herein as starting material e)). The resulting reaction product may be purified, for example by filtration, stripping, and/or distillation to recover the promoter. Alternatively, promoters for use in the process herein may be synthesized, for example, by the methods of Reference Examples 1 and 2, described below.

Alternatively, the promoter, such as the hydrocarbyloxy-functional arylsilanes described above, may be synthesized, for example, by a process comprising:

1) combining starting materials comprising:
    a) an unsaturated alcohol, and
    b) an amine,
thereby forming c) a mixture, and
2) adding c) the mixture to d) an SiH functional halosilane; thereby forming f) a reaction product comprising g) the promoter. The process may optionally be performed in the presence of e) a solvent. Steps 1) and 2) may be performed at RT; alternatively, steps 1) and 2) may be performed at a temperature of −20° C. to 40° C.; alternatively, 0° C. to 20° C.

The process described above may optionally further comprise step 3): recovering g) the promoter from f) the reaction mixture. Recovering in step 3) may be performed by any convenient means, for example by filtration, washing with solvent, stripping, and/or distillation to recover g) the promoter from unreacted starting materials, by-products, if any, and e) solvent, if used. One or more of the process steps may be performed under an inert atmosphere, such as nitrogen. For example, steps 1) and 2) described above may optionally further comprise flowing inert gas through the vessel headspace. Without wishing to be bound by theory, it is thought that flowing inert gas though the reactor headspace may help to remove low-boiling impurities from the system.

Starting Material a) Unsaturated Alcohol

The unsaturated alcohol used to prepare the promoter may have formula

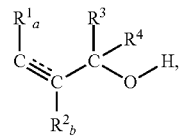

where $R^1$, $R^2$, $R^3$, $R^4$, and subscripts a and b are as described above. Suitable unsaturated alcohols are known in the art and are commercially available. For example, allyl alcohol and propargyl alcohol are available from Millipore Sigma of St. Louis, Mo., USA. The alcohol may be used in a 1:1 ratio to starting material d) the SiH functional halosilane; alternatively, 1.1 Alcohol to 1 halosilane. It is important to avoid using too much alcohol as the —OH can react with Si—H to generate hydrogen, especially in the case of propargyl alcohol, HC≡C—CH$_2$—OH, where hydrogen gas generation will slowly occur. It is also important to minimize residual halosilane as halide impurities decrease the selectivity of the catalyst. It is also important to have minimal excess alcohol as alcohols are known to those in the art, to increase the solubility of ammonium salts in non-polar organic solvents, making the removal of ammonium halide salts by filtration, less effective.

Starting Material b) Amine

Starting material b) in this process to prepare the promoter may be a tertiary amine. The tertiary amine may be a trialkyl amine. The trialkyl amine may have formula $NR^{21}_3$, where each $R^{21}$ is an independently selected alkyl group of 2 to 16 carbon atoms, alternatively 2 to 12 carbon atoms, alternatively 2 to 8 carbon atoms, and alternatively 2 to 4 carbon atoms. Alternatively, the trialkyl amine may be triethylamine. Tertiary amines are known in the art and are commercially available, e.g., from Millipore Sigma of St. Louis, Mo., USA. Alternatively, starting material b) may comprise pyridine and derivatives thereof. Starting material b) may be used in a 1:1 mole ratio to starting material d), the SiH functional halosilane, alternatively, the amounts of starting materials b) and d) may be such that a b):d) ratio is 1.5:1; alternatively, 1:1 to 1.1:1. Without wishing to be bound by theory, it is thought that it is important to have a sufficient amount of starting material b) (e.g., trialkyl amine) to maximize consumption of the halide of d) the SiH functional halosilane. Without wishing to be bound by theory, it is thought that it is also important to have minimal excess amount of starting material b) (e.g., trialkyl amine), to increase the solubility of ammonium salts in non-polar organic solvents, making the removal of ammonium halide salts by filtration, less effective.

Starting Material d) SiH-Functional Halosilane

Starting material d) in this process to prepare the promoter is an SiH-functional halosilane. The SiH-functional halosilane may have formula

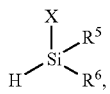

where $R^5$ and $R^6$ are as described above, and X is a halogen atom selected from the group consisting of F, Cl, Br, and I; alternatively F, Cl, and Br; alternatively Cl and Br; alternatively Cl; and alternatively Br. Examples of suitable SiH-functional halosilanes include diphenylchlorosilane ($Ph_2HSiCl$), phenylmethylchlorosilane (PhMeHSiCl), chloro-methyl-(2,4,6-tri-isopropyl-phenyl)silane, and chloro-di-(2,4,6-trimethylphenyl)silane. Suitable SiH-functional halosilanes are commercially available. For example, diphenylchlorosilane is available from Millipore Sigma of St. Louis, Mo., USA. Alternatively, SiH-functional halosilanes may be synthesized by known methods, such as Grignard reaction of a hydridohalosilane (e.g., of formula $H_dR^{22}_eSiX_{(4-d-e)}$ where X is as described above; $R^{22}$ is an alkyl group of 1 to 18 carbon atoms, alternatively 1 to 12 carbon atoms, alternatively 1 to 6 carbon atoms, alternatively methyl; subscript d is 1 or 2, subscript e is 0 or 1, and a quantity (d+e)<4) and an aryl Grignard reagent, such as an arylmagnesium bromide in the presence of an ether and optionally a solvent as described herein for starting material e). One skilled in the art would be able to prepare the SiH-functional halosilane described above using processes such as those disclosed in U.S. Pat. Nos. 7,456,308 and 7,351,847, and the references cited therein, by varying appropriate starting materials.

Starting Material e) Solvent

Starting material e) in this process to prepare the promoter is an SiH-functional halosilane is a solvent that may optionally be added during and/or after step 1) and/or step 2) of the process. Suitable solvents include, polyalkylsiloxanes, aromatic hydrocarbons, aliphatic hydrocarbons, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Mich., U.S.A.

Alternatively, starting material e) may comprise an organic solvent. The organic solvent can be an aromatic hydrocarbon such as benzene, toluene, or xylene; an aliphatic hydrocarbon such as pentane, heptane, hexane, or octane; mineral spirits; naphtha; or a combination thereof.

The amount of solvent will depend on various factors including the type of solvent selected and the amount and type of other starting materials selected for the process described herein. However, the amount of solvent may be 0% to 95%, based on combined weights of starting materials a), b), c), d) and e). The solvent may be added during step 1) and/or step 2), for example, to aid mixing and delivery of one or more starting materials. The process may optionally further comprise removing all or a portion of the solvent after step 2).

Alternatively, the promoter described above may be synthesized, for example, by a process comprising using, as starting material a) a compound of formula M—O—$CH_2$—CH=$CH_2$; where M is selected from the group consisting of Li, Na, K, Rb, and Cs in a 1:1 ratio with starting material d) the SiH functional halosilane described above. Alternatively, the hydrocarbyloxy-functional arylsilane described above may be synthesized, for example, by a process comprising using, as starting material a) a compound of formula M'-(O—$CH_2$—CH=$CH_2$)$_2$; where M'=Mg, Ca, Sr, Ba which would give the corresponding metal halide salt.

The promoter is used in an amount sufficient to provide a platinum to promoter ratio ≥1:3; alternatively ≥1:5; and alternatively ≥1:8 or greater. However, the amount of promoter in the reaction mixture should be less than 5% of the total mass of reagents, catalysts, solvents, and promoters. Examples of promoters (and acronyms for promoters that will be discussed in Examples) are given in Table 1, below.

TABLE 1

Promoters and their corresponding acronyms.

| Promoter | Acronym |
|---|---|
| Allyloxy-dimethylsilane | AMM |
| Allyloxy-diphenylsilane | APP |
| Allyloxy-bis(2,4,6-trimethylphenyl)silane | AEE |
| Allyloxy-methyl-(2,4,6-triisopropylphenyl)silane | ATM |
| (l-methyl)allyloxy-dimethylsilane | M1AMM |
| (1,1-dimethyl)allyloxy-dimethylsilane | M2AMM |
| (1-methyl)allyloxy-diphenylsilane | M1APP |
| (1,1-dimethyl)allyloxy-diphenylsilane | M2APP |
| Propargyloxy-dimethylsilane | PMM |
| (1-methyl-2-propyn-1-yl)oxy-diphenylsilane | M1PPP |
| Acetoxydimethylsilane | AcMM |

Starting Material d) SiH-Terminated Siloxane Oligomer

Starting material d) in the process for making the cyclic polysiloxazane is an SiH-terminated siloxane oligomer. The oligomer may have formula

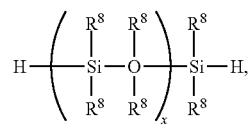

where each $R^8$ is an independently selected monovalent hydrocarbon group of 1 to 18 carbon atoms and subscript x is 1 or 2. Each $R^8$ may be an alkyl group or an aryl group. Suitable alkyl groups for $R^8$ are exemplified by those described above for $R^9$. Suitable aryl groups for $R^8$ are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, the aryl group for $R^8$ may be phenyl. Alternatively, each $R^8$ may be an alkyl group, alternatively methyl. Alternatively, the SiH-terminated siloxane oligomer may be selected from the group consisting of 1,1,3,3-tetramethyldisiloxane and 1,1,3,3,5,5-hexamethyltrisiloxane, which are available from Dow Silicones Corporation of Midland, Mich., USA and Gelest, Inc. of Morrisville, Pa., USA, respectively. The amounts of starting materials a) and d) are such that the allyl-functional amine to oligomer ratio may range from 5:1 to 1:2, alternatively 2:1 to 1:1.2, and alternatively 1.2:1 to 1:1.1.

Starting Material e) Solvent

Starting material e) in the process for preparing the cyclic polysiloxazane is a solvent that may optionally be added during and/or after step 1) of the process. Suitable solvents include, polyalkylsiloxanes, aromatic hydrocarbons, aliphatic hydrocarbons, glycol dialkyl ethers, dialkyl ethers, alkyl-polyglycol ethers, cyclic alkyl ethers, tetrahydrofuran, mineral spirits, naphtha, or a combination thereof. Polyalkylsiloxanes with suitable vapor pressures may be used as the solvent, and these include hexamethyldisiloxane, octamethyltrisiloxane, and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Mich., U.S.A.

Alternatively, starting material e) may comprise an organic solvent. The organic solvent can be an aromatic hydrocarbon such as benzene, toluene, or xylene; an aliphatic hydrocarbon such as heptane, hexane, or octane; tetraglyme, or ethylene glycol n-butyl ether, di-n-butyl ether, tetrahydrofuran; mineral spirits; naphtha; or a combination thereof.

The amount of solvent will depend on various factors including the type of solvent selected and the amount and type of other starting materials selected for use in the process described above. However, the amount of solvent may be 0% to 50%, based on combined weights of starting materials a), b), c), d) and e). The solvent may be added during step 1) and/or step 2), for example, to aid mixing and delivery of one or more starting materials. For example, the catalyst may be delivered in a solvent. The process may optionally further comprise removing all or a portion of the solvent after step 2).

Additional Detail about the Process Steps

Step 1) of the process described herein comprises combining starting materials comprising a) the allyl-functional amine, b) the platinum catalyst capable of catalyzing hydrosilylation reaction, c) the hydrosilylation reaction promoter and optionally e) the solvent, as described above. Combining in step 1) may be performed by mixing the starting materials a), b), and c) to form a reaction mixture, and heating the reaction mixture to a temperature up to 150° C., alternatively up to 120° C., alternatively up to 110° C., alternatively up to 95° C., and alternatively 50° C. to 150° C.

Alternatively, starting material b), the platinum catalyst, and starting material c), the hydrosilylation reaction promoter, may be combined before combining starting material a), the allyl-functional amine in step 1). For example, starting material b) and starting material c) may be combined by mixing, optionally in the presence of a solvent, under ambient conditions (RT and ambient pressure) for at least 1 day, alternatively at least 1 week, alternatively 2 weeks, alternatively 1 month, alternatively at least 4 h, and alternatively 4 h to 4 months, before combining with starting material a) in step 1). When starting material c) contains a carbon-carbon triple bond, it is combined with starting material b) the platinum catalyst before combining the resulting mixture with either starting material a) the allyl-functional amine or d) a SiH-terminated siloxane oligomer. The mixture prepared by combining starting materials b) and c) may be aged for at least 1 week at room temperature, alternatively 2 weeks, alternatively 1 month before combining with starting material a) or starting material d). Alternatively, if starting materials b) and c) are mixed at elevated temperature, e.g., >30° C. to 90° C., the aging time may be reduced.

In step 2) of the process for making the cyclic polysiloxazane, step 2) may be performed at a temperature of 20° C. to 200° C., alternatively 50° C. to 150° C., alternatively 70° C. to 110° C. and alternatively 70° C. to <110° C. Without wishing to be bound by theory, it is thought that adding d) the Si-terminated siloxane oligomer either incrementally or slowly over time may improve safety of the process described herein. By controlling temperature and the addition of a reactant, potential for uncontrolled exothermic reaction may be minimized.

The process may optionally further comprise step 3) purifying the cyclic polysiloxazane after step 2). For example, the process described above may produce a crude product comprising the cyclic polysiloxazane, unreacted starting materials, and when used, solvent. Step 3) may be performed by stripping and/or distillation, optionally under vacuum, e.g., by heating up to 120° C.

Cyclic Siloxazane

The process described above produces a cyclic siloxazane. The cyclic siloxazane has a general formula selected from the group consisting of

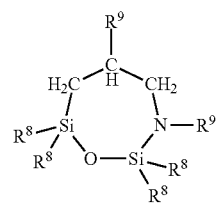

(when subscript x=0) and

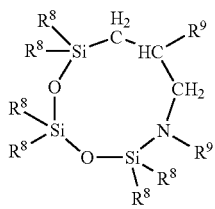

(when subscript x=1), where $R^8$ and $R^9$ are as described above.

For example, when the SiH-terminated siloxane oligomer is 1,1,3,3-tetramethyldisiloxane and the allyl-functional amine is allyl amine (each $R^8$ is methyl and each $R^9$ is hydrogen) then the cyclic polysiloxazane has formula:

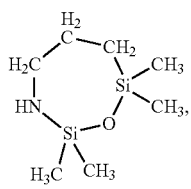

which can be abbreviated —SiMe$_2$OSiMe$_2$C$_3$H$_6$NH— (i.e., 1,1,3,3,-tetramethyl-2-oxa-7-aza-1,3-disilacycloheptane); and when the SiH-terminated siloxane oligomer is 1,1,3,3,5,5-hexamethyltrisiloxane, and the allyl-functional amine is allyl amine (each $R^8$ is methyl and each $R^9$ is hydrogen) then the cyclic polysiloxazane has formula:

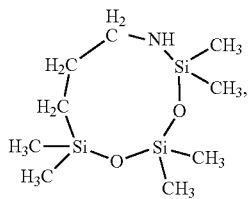

which can be abbreviated —SiMe$_2$OSiMe$_2$OSiMe$_2$C$_3$H$_6$NH— (i.e., 1,1,3,3,5,5-hexamethyl-2,4-di-oxa-9-aza-1,3,5-trisilacyclononane).

Alternatively, when the SiH-terminated siloxane oligomer is 1,1,3,3-tetramethyldisiloxane and the allyl-functional amine is N-allyl-N,N-dimethylamine, the cyclic polysiloxazane has formula:

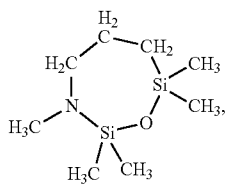

and when the SiH-terminated siloxane oligomer is 1,1,3,3,5,5-hexamethyltrisiloxane, and the allyl-functional amine is N-allyl-N,N-dimethylamine, the cyclic polysiloxazane has formula

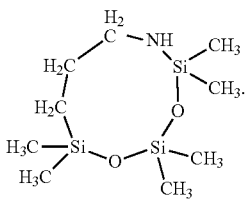

Alternatively, when the SiH-terminated siloxane oligomer is 1,1,3,3-tetramethyldisiloxane and the allyl-functional amine is 2-methyl-allylamine, then the cyclic polysiloxazane has formula:

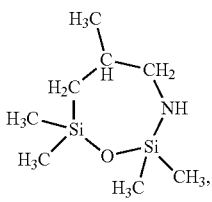

which can be abbreviated, —SiMe$_2$OSiMe$_2$CH$_2$CH(CH$_3$)CH$_2$NH— (i.e., 1,1,3,3,5-pentamethyl-2-oxa-7-aza-1,3,5-disilacycloheptane). And, when the SiH-terminated siloxane oligomer is 1,1,3,3,5,5-hexamethyltrisiloxane and the allyl-functional amine is 2-methyl-allylamine, then the cyclic polysiloxazane has formula

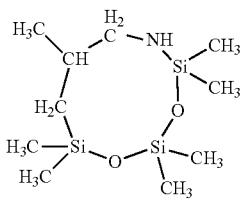

i.e., 1,1,3,3,5,5,7-heptamethyl-2,3-di-oxa-9-aza-1,3,5-trisilacyclononane. The cyclic polysiloxazanes prepared by the process described above are useful for preparing amino-functional polyorganosiloxanes.

Without wishing to be bound by theory, it is thought that the process described herein may produce a cyclic polysiloxazane with a beneficial purity profile. For example, the cyclic polysiloxazane may have an SiH content <100 ppm, an unsaturated olefin content <100 ppm, and/or an allyl-functional amine content <50 ppm, wherein said contents were measured by GC-FID, GC-mass spec, $^1$H NMR, $^{13}$C NMR and $^{29}$Si NMR (impurities undetectable with a conservative instrument Limit of Detection of 50 ppm), as described in the examples, below. Furthermore, it is thought that this purity profile is beneficial for forming amino-functional polyorganosiloxanes suitable for use in personal care applications. Allyl-functional amines and SiH containing components are generally undesirable in personal care compositions, such as hair care compositions. Therefore, the cyclic polysiloxazane described above is useful for capping silanol-functional polyorganosiloxanes, such as silanol terminated polydimethylsiloxanes, thereby preparing amino-functional polyorganosiloxanes suitable for use in personal care compositions. Furthermore, the inventors surprisingly found that during the synthesis of cyclic —SiMe$_2$OSiMe$_2$C$_3$H$_6$NH—, a new intermediate formed. The intermediate had formula H$_2$N(C$_3$H$_6$)SiMe$_2$OSiMe$_2$NH—CH$_2$CH=CH$_2$.

Part II. Preparing an Amino-Functional Polyorganosiloxane

A. Process for Preparing an Amino-Functional Polyorganosiloxane Using the Cyclic Polysiloxazane A process for preparing an amino-functional organosilicon compound (e.g., amino-functional silane and/or amino-functional polyorganosiloxane) comprises:
1) combining starting materials comprising:
A) the cyclic polysiloxazane prepared as described above, and
D) a silanol-functional organosilicon compound, which may be selected from the group consisting of D-I) a silanol-functional silane, D-II) a silanol-functional polyorganosiloxane or both D-I) and D-II; thereby preparing a reaction product comprising the amino-functional organosilicon compound; and
optionally 2) recovering the amino-functional organosilicon compound.

Starting Material D-I) Silanol-Functional Silane

The silanol-functional silane may have formula HOSiR$^{21}$R$^{22}$R$^{23}$, where R$^{21}$, R$^{22}$, and R$^{23}$ are each independently selected monovalent hydrocarbon groups of 1 to 18 carbon atoms, as described and exemplified above for R$^8$. Alternatively, R$^{21}$, R$^{22}$, and R$^{23}$ may each be independently an alkyl group of 1 to 15 carbon atoms, alternatively 1 to 12 carbon atoms, and alternatively 1 to 6 carbon atoms. Alternatively, R$^{21}$, R$^{22}$, and R$^{23}$ may each be independently an methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. Alternatively, each alkyl group for R$^{21}$, R$^{22}$, and R$^{23}$ may be methyl, ethyl, propyl, or butyl; alternatively ethyl or propyl. Silanol-functional silanes are known in the art and are commercially available. For example, triethylsilanol and triisopropylsilanol are commercially available from Millipore Sigma of St. Louis, Mo., USA.

Starting Material D-II) Silanol-Functional Polyorganosiloxane

Starting material D-II) in the process for preparing an amino-functional polyorganosiloxane comprises a silanol-functional polyorganosiloxane. The silanol-functional polyorganosiloxane has at least one silicon-bonded hydroxyl (silanol) group per molecule. The silanol-functional polyorganosiloxane may be linear, branched, partly branched, cyclic, resinous (i.e., have a three-dimensional network), or may comprise a combination of different structures. For example, the silanol-functional polyorganosiloxane may comprise any combination of M, D, T and/or Q units, so long as the silanol-functional polyorganosiloxane includes at least one silicon-bonded hydroxyl group. These siloxy units can be combined in various manners to form cyclic, linear, branched and/or resinous (three-dimensional networked) structures. Alternatively, the silanol-functional polyorganosiloxane may be a silanol-functional polydiorganosiloxane. The silanol-functional polyorganosiloxane may have silanol groups at terminal positions, at pendant positions, or both terminal and pendant positions.

The silanol groups may be present in any M, D, and/or T unit present in the silanol-functional polyorganosiloxane, and may be bonded to the same silicon atom (in the case of M and/or D siloxy units). The silanol-functional polyorganosiloxane may comprise, for example, as M units: (R$^8_3$SiO$_{1/2}$), (R$^8_2$(OH)SiO$_{1/2}$), (R$^8$(OH)$_2$SiO$_{1/2}$), and/or ((OH)$_3$SiO$_{1/2}$), where R$^8$ is as described above. The silanol-functional polyorganosiloxane may comprise, for example, as D units: (R$^8_2$SiO$_{2/2}$), (R$^8$(OH)SiO$_{2/2}$), and/or ((OH)$_2$SiO$_{2/2}$). The silanol-functional polyorganosiloxane may comprise, for example, as T units: (R$^8$SiO$_{3/2}$) and/or ((OH)SiO$_{3/2}$). Such siloxy units may be combined in any manner, optionally along with Q units, to give a silanol-functional polyorganosiloxane having at least one silicon-bonded OH group per molecule.

The silanol-functional polyorganosiloxane is branched or resinous when the D-II) silanol-functional polyorganosiloxane includes T units and/or Q units. When the silanol-functional polyorganosiloxane is branched or resinous, the silanol-functional polyorganosiloxane is typically a copolymer including T units and/or Q units in combination with M units and/or D units. For example, the silanol-functional polyorganosiloxane can be a DT resin, an MT resin, an MDT resin, a DTQ resin, an MTQ resin, an MDTQ resin, a DQ resin, an MQ resin, a DTQ resin, an MTQ resin, or an MDQ resin. Alternatively, the silanol-functional polyorganosiloxane may be linear, in which case the silanol-functional polyorganosiloxane is a silanol-functional polydiorganosiloxane comprising D units in combination with M units.

The silanol-functional polyorganosiloxane for starting material D-II) may be a silanol-functional polydiorganosiloxane. The silanol-functional polydiorganosiloxane may comprise unit formula (D1): (R$^8_3$SiO$_{1/2}$)$_e$(R$^8_2$SiO$_{2/2}$)$_f$(R$^8$(OH)SiO$_{2/2}$)$_g$(R$^8_2$(OH)SiO$_{1/2}$)$_h$, where R$^8$ is as described above; and the subscripts have values such that: 2≥e≥0, 4000≥f≥0, 4000≥g≥0, and 2≥h≥0, with the provisos that a quantity (e+h)=2, a quantity (g+h)≥2, and a quantity 4≤(e+f+g+h)≤8000. Alternatively, 4≤(e+f+g+h)≤4000. Alternatively, 10≤(e+f+g+h)≤2,000. Alternatively, subscripts e to h may have values sufficient to provide the silanol functional polydiorganosiloxane with a viscosity of 8 mPa·s to 100,000,000 mPa·s; alternatively, 8 mPa·s to 40,000,000 mPa·s, 70 mPa·s to less than 1,000,000 mPa·s, alternatively 70 mPa·s to 500,000 mPa·s, alternatively 10 mPa·s to 150,000 mPa·s, and alternatively, 70 mPa·s to 16,000 mPa·s measured at 25° C. Alternatively, each R$^8$ may be selected from alkyl and aryl. Alternatively, each R$^8$ may be selected from methyl and phenyl. Alternatively, at least 80% of all R$^8$ groups are methyl.

Alternatively, the silanol-functional polydiorganosiloxane may be a silanol-terminated polydiorganosiloxane. The silanol-terminated polydiorganosiloxane may have formula (D2):

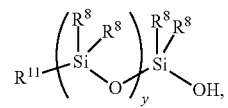

where R$^{11}$ is selected from the group consisting of OH and R$^8$ and subscript y has a value sufficient to provide the silanol functional polydiorganosiloxane with a viscosity of 8 mPa·s to 100,000,000 mPa·s; alternatively, 8 mPa·s to 40,000,000 mPa·s, 70 mPa·s to less than 1,000,000 mPa·s, alternatively 70 mPa·s to 500,000 mPa·s; alternatively 70 mPa·s to 500,000 mPa·s, alternatively 10 mPa·s to 150,000 mPa·s, and alternatively, 70 mPa·s to 16,000 mPa·s measured at 25° C. (alternatively, y may be 2 to 4000; and alternatively y may be 2 to 2000). Silanol-terminated polydiorganosiloxanes suitable for use as starting material A) may be prepared by methods known in the art, such as hydrolysis and condensation of the corresponding organohalosilanes or equilibration of cyclic polydiorganosiloxanes.

Alternatively, the silanol-functional polyorganosiloxane may be a silanol-functional polysiloxane resin. The polysiloxane resin may have unit formula (D3): $(R^{20}_3SiO_{1/2})_A(R^{20}_2SiO_{2/2})_B(R^{20}SiO_{3/2})_C(SiO_{4/2})_D$, where subscripts A, B, C, and D are mole fractions that have values such that $0 \leq A \leq 0.6$, $0 \leq B \leq 0.5$, $0 \leq C \leq 1$, $0 \leq D \leq 1$, with the provisos that a quantity (C+D)>0. In the polysiloxane resin, each $R^{20}$ is independently a monovalent hydrocarbon group as described above for $R^8$ or a hydrolysable group (e.g., a hydroxyl group or an alkoxy group). At least one $R^{20}$ per molecule is a hydrolysable group. Suitable hydrolysable groups include hydroxyl; alkoxy such as methoxy and ethoxy; alkyloxy such as isopropenyloxy; amidoxy such as acetamidoxy; and aminoxy such as N,N-dimethylaminoxy.

Alternatively, the polysiloxane resin may be (D4) a polyorganosilicate resin or (D5) a silsesquioxane resin. The polyorganosilicate resin comprises monofunctional units (M units) of formula $R^{20}_3SiO_{1/2}$ and tetrafunctional silicate units (Q units) of formula $SiO_{4/2}$, where $R^{20}$ is as described above. Alternatively, in the polyorganosilicate resin, the monovalent hydrocarbon group for $R^{20}$ may be independently selected from the group consisting of alkyl, alkenyl and aryl, such as those described above for $R^8$. Alternatively, the monovalent hydrocarbon group for $R^{20}$ may be selected from alkyl and aryl. Alternatively, the monovalent hydrocarbon group for $R^{20}$ may be selected from methyl and phenyl. Alternatively, at least one-third, alternatively at least two thirds of the $R^{20}$ groups are methyl groups. Alternatively, the M units in the polyorganosilicate resin may be exemplified by $(Me_3SiO_{1/2})$ and $(Me_2PhSiO_{1/2})$. The polyorganosilicate resin is soluble in solvents, exemplified by liquid hydrocarbons, such as benzene, toluene, xylene, and heptane, or in liquid organosilicon compounds such as low viscosity linear and cyclic polydiorganosiloxanes (such as the solvents described above for starting material e) in the process for preparing the cyclic polysiloxazane.

When prepared, the polyorganosilicate resin comprises the M and Q units described above, and the polyorganosiloxane further comprises units with silicon bonded hydroxyl groups and may comprise neopentamer of formula $Si(O-SiR^{20}_3)_4$, where $R^{20}$ is as described above, e.g., the neopentamer may be tetrakis(trimethylsiloxy)silane. $^{29}$Si NMR spectroscopy (as described below) may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1, alternatively 0.6:1 to 0.9:1.

The MQ silicone resin may contain 5.0% or less, alternatively 0.7% or less, alternatively 0.3% or less, of terminal units represented by the formula $X''SiO_{3/2}$, where $X''$ represents a hydrolyzable group such as hydroxyl; alkoxy such as methoxy and ethoxy; alkenyloxy such as isopropenyloxy; amidoxy such as acetamidoxy; and aminoxy such as N,N-dimethylaminoxy. The concentration of silanol groups present in the silicone resin can be determined using $^1$H NMR and/or $^{29}$Si NMR.

The Mn to achieve the desired flow characteristics of the MQ silicone resin can depend at least in part on the Mn of the silicone resin and the type of hydrocarbon group, represented by $R^{20}$, that are present in this starting material. The Mn of the MQ silicone resin is typically greater than 1,000 Da, alternatively 1,000 Da to 15,000 Da, alternatively >3,000 Da to 8,000 Da, and alternatively 4,500 to 7,500 Da.

The MQ silicone resin can be prepared by any suitable method. Silicone resins of this type have reportedly been prepared by cohydrolysis of the corresponding silanes or by silica hydrosol capping methods known in the art. Briefly stated, the method involves reacting a silica hydrosol under acidic conditions with a hydrolyzable triorganosilane such as trimethylchlorosilane, a siloxane such as hexamethyldisiloxane, or a combination thereof, and recovering a product comprising M and Q units (MQ resin). The resulting MQ resins may contain from 2 to 5 percent by weight of silicon-bonded hydroxyl groups.

The intermediates used to prepare the polyorganosilicate resin may be triorganosilanes and silanes with four hydrolyzable substituents or alkali metal silicates. The triorganosilanes may have formula $R^8_3SiX^1$, where $R^8$ is as described above and $X^1$ represents a hydrolyzable substituent such as that described above for $X''$. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contain silicon bonded hydroxyl groups, i.e., of formulae, $HOSi_{3/2}$, $(HO)_2Si_{2/2}$, $(HO)_3Si_{1/2}$, and/or $HOR^{20}_2SiO_{1/2}$. The polyorganosilicate resin may comprise up to 5% of silicon bonded hydroxyl groups, as measured by FTIR spectroscopy. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

In one embodiment, starting material D) comprises (D6) a polyorganosilicate resin comprising unit formula $(R^{20}_3SiO_{1/2})_c(R^{20}_2SiO_{2/2})_d(SiO_{4/2})_e$, where subscripts c, d, and e are mole fractions that have values such that $0<c<0.6$, $0 \leq d<0.5$, $0.4<e<1$; and $R^{20}$ is as described above, with the proviso that at least one $R^{20}$ per molecule is a hydrolyzable group in (D6). Alternatively, the hydrolyzable group for $R^{20}$ is selected from a hydroxyl group or an alkoxy group, such as methoxy or ethoxy, and alternatively the hydrolyzable group is a hydroxyl group.

Various suitable polyorganosilicate resins are commercially available from sources such as Dow Silicones Corporation of Midland, Mich., U.S.A., Momentive Performance Materials of Albany, N.Y., U.S.A., and Bluestar Silicones USA Corp. of East Brunswick, N.J., U.S.A. For example, DOWSIL™ MQ-1600 Solid Resin, DOWSIL™ MQ-1601 Solid Resin, and DOWSIL™ 1250 Surfactant, Momentive SR-1000, and Wacker TMS-803, all of which are commercially available from Dow Silicones Corporation of Midland, Mich., USA, are suitable for use in the methods described herein. Alternatively, a resin containing M, T, and Q units may be used, such as DOWSIL™ MQ-1640 Flake Resin, which is also commercially available from Dow Silicones Corporation. Such resins may be supplied in organic solvent.

Alternatively, the polysiloxane resin may comprise (D7) a silsesquioxane resin, i.e., a resin comprising T units of formula ($R^{20}SiO_{3/2}$), where $R^{20}$ is as described above with the proviso that at least one $R^{20}$ per molecule is a hydrolyzable group in (D7). Silsesquioxane resins suitable for use herein are known in the art and are commercially available. For example, a methylmethoxysiloxane methylsilsesquioxane resin is commercially available as DOWSIL™ US-CF 2403 Resin from Dow Silicones Corporation of Midland, Mich., U.S.A. Alternatively, the silsesquioxane resin may have phenylsilsesquioxane units, methylsilsesquioxane units, or a combination thereof. Such resins are known in the art and are commercially available as DOWSIL™ 200 Flake resins, also available from Dow Silicones Corporation. Alternatively, the silsesquioxane resin may further comprise D units of formulae ($R^8_2SiO_{2/2}$) and/or ($R^8X''SiO_{2/2}$) and T units of formulae ($R^8SiO_{3/2}$) and/or ($X''SiO_{3/2}$), i.e., a DT resin, where $R^8$ and $X''$ are described above. DT resins are known in the art and are commercially available, for example, methoxy functional DT resins include DOWSIL™ 3074 and DOWSIL™ 3037 resins; and silanol functional resins include DOWSIL™ 800 Series resins, which are also commercially available from Dow Silicones Corporation. Other suitable resins include DT resins containing methyl and phenyl groups.

Starting material D) may be one silanol-functional organosilicon compound or may comprise two or more silanol-functional organosilicon compounds differing in at least one of the following properties: structure, viscosity, average molecular weight, siloxane units, and sequence. Alternatively, starting material D) may comprise a mixture of two or more polyorganosilicate resins. Alternatively, starting material D) may comprise a mixture of two or more silanol-functional polyorganosiloxanes, such as a bis-hydroxyl-terminated polydiorganosiloxane and a polyorganosilicate resin. Alternatively, starting material D) may comprise a mixture of a silanol-functional silane and a silanol-functional polyorganosiloxane. Alternatively, starting material D) may comprise a mixture of two or more silsesquioxane resins.

The amount of starting materials depends on various factors including the species of starting material D) selected and the silanol content thereof. For example, a 1:1 to 1:1.25 mole ratio of SiOH to cyclic siloxazane can be used when starting material D) comprises linear silanol-functional polydiorganosiloxanes. Alternatively, a 2% to 5% molar excess of cyclic siloxazane relative to silanol content of starting material D) may be used, alternatively up to a 20% molar excess silanol may be used. Addition of cyclic siloxazane substoichiometric to silanol content of starting material D-II) may give reaction product mixtures with residual silanol-functional polyorganosiloxane, terminal amino-functional polyorganosiloxane, and polyorganosiloxanes with both a silanol and organoamino-functional termination. For resinous starting materials D-II), on average 5% to 30% of residual silanol might not be consumed and a maximum of >99% can typically be capped.

Step 1) (combining starting materials comprising A) and D)) in the process for preparing the amino-functional organosilicon polyorganosiloxane described above may be performed by any convenient means, such as mixing, optionally with heating. Mixing and heating may be performed using any convenient means, such as loading the starting materials into a vessel such as an agitated, jacketed batch reactor or reactive distillation apparatus having a jacketed reboiler, which jackets can be heated and cooled by passing steam/water or heat transfer fluid through the jacket. The process may be performed at a temperature of at least 50° C., alternatively at least 85° C., and alternatively at least 90° C. Alternatively, heating in step 1) may be performed at 50° C. to 150° C., alternatively 85° C. to 150° C., and alternatively 90° C. to 150° C. The process is performed for a time sufficient to form the amino-functional polyorganosiloxane.

In step 1), one of starting material A) and starting material D) may be added continuously or in increments into a vessel containing the other of starting material A) and starting material D). Such addition may be performed manually or using metering equipment.

The process described above may optionally further comprise one or more additional steps. The process may optionally further comprise step 3) adding one or more additional starting materials to the reaction mixture in step 1). Alternatively, step 3) may be performed during and/or after step 1) and before step 2). The additional starting material may be selected from the group consisting of E) an acid precatalyst, F) an aminoalkyl-functional alkoxysilane, G) an endblocker, H) a solvent, and a combination of two or more of E), F), G) and H).

Starting Material E) Acid Precatalyst

Starting material E) in the process for preparing the amino-group-terminated polydiorganosiloxane comprises an acid precatalyst. The acid precatalyst may be a carboxylic acid. Without wishing to be bound by theory, it is thought that the carboxylic acid will react with the amino-functional group in the cyclic polysiloxazane (or, when present, the α-alkoxy-ω-amino-functional polysiloxane, as described below) to form a carboxylate salt catalyst. The carboxylic acid can be chosen from a wide range of carboxylic acids. The carboxylic acid can, for example, be an aliphatic carboxylic acid having 1 to 20 carbon atoms, alternatively 2 to 20 carbon atoms. For example, acetic acid, propionic acid, octanoic, decanoic or lauric acid are suitable for use herein. Alternatively, aliphatic carboxylic acids substituted by a hydrophilic group such as hydroxyl, for example lactic acid, can be used. Alternatively, carboxylic acids substituted by an electron-withdrawing moiety, for example halogen such as fluorine or chlorine or a hydroxyl group, may be used, and examples of such acids substituted by an electron-withdrawing moiety are lactic acid and fluoroalkanoic acids such as fluoroacetic acid or 4,4,4-trifluorobutanoic acid. Other suitable carboxylic acids include benzoic acid, citric acid, maleic acid, myristic acid, and salicylic acid. Alternatively, a combination of two or more of the above carboxylic acids may be used.

F) Aminoalkyl-Functional Alkoxysilane

The process for preparing the amino-functional polyorganosiloxane may optionally further comprise: adding starting material F), an aminoalkyl-functional alkoxysilane. Without wishing to be bound by theory, it is thought that adding F) the amino-functional alkoxysilane will provide an amino-functional organosilicon product, which can be an amino-group-terminated polyorganosiloxane which further comprises pendant amino-functional groups.

Starting material F) contains an aminoalkyl group and an alkoxy group bonded to Si. The aminoalkyl group may have formula (F1): $R^{13}$—$(NH-A)_q$-NH-A- wherein A and A' are each independently a linear or branched alkylene group having 1 to 6 carbon atoms and optionally containing an ether linkage; subscript q is 0 to 4; $R^{13}$ is hydrogen, an alkyl group, or a hydroxyalkyl group having 1 to 4 carbon atoms. Alternatively, $R^{13}$ may be hydrogen; q may be 0 or 1; and A and A' (if present) each contain 2 to 4 carbon atoms. Examples of suitable aminoalkyl groups include —$(CH_2)_3$ $NH_2$, —$(CH_2)_4NH_2$, —$(CH_2)_3NH(CH_2)_2NH_2$, —$CH_2CH$ $(CH_3)CH_2NH(CH_2)_2NH_2$, —$(CH_2)_3NHCH_2CH_2NH(CH_2)_2$ $NH_2$, —$CH_2CH(CH_3)CH_2NH_2$, —$CH_2CH(CH_3)CH_2NH$ $(CH_2)_3NH_2$, —$(CH_2)_3NH(CH_2)_4NH_2$, and —$(CH_2)_3O$ $(CH_2)_2NH_2$. The alkoxy group bonded to Si can contain an unreactive substituent or linkage such as an ether linkage. The aminoalkyl-functional alkoxysilane may have formula (F2):

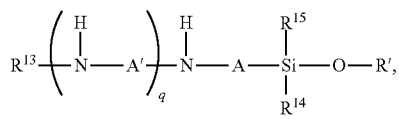

where A, A', $R^{13}$, and subscript q are as defined above; R' is an alkyl group or an alkoxyalkyl group having 1 to 6 carbon atoms, for example, methyl, ethyl, butyl or methoxyethyl; and $R^{14}$ and $R^{15}$ are each independently a group —OR' or an optionally substituted alkyl or aryl group. Alternatively, for the preparation of linear polydiorganosiloxanes, the group $R^{14}$ may be an alkyl group such as methyl and the group $R^{15}$ may have the formula —OR', such as methoxy or ethoxy. Examples of aminoalkyl-functional alkoxysilanes suitable for starting material F) include F3) 3-aminopropylmethyl dimethoxysilane, F4) 3-aminopropylmethyl diethoxysilane, F5) aminoethyl-aminoisobutyl methyl dimethoxy silane, F6) aminoethyl-aminoisobutyl methyl diethoxysilane, F7) 3-aminopropyldimethyl ethoxysilane, F8) 3-aminopropyldimethyl methoxysilane, F9) 3-(2-aminoethylamino)propyldimethoxymethylsilane, F10) 3-(2-aminoethylamino)propyl-diethoxymethylsilane, F11) aminopropyl methyl dimethoxy silane, F12) aminopropyl methyl diethoxysilane, and F13) a combination of two or more of F3) to F12). In one embodiment, the aminoalkyl-functional alkoxysilane comprises a monoalkoxysilane, such as F7) 3-aminopropyldimethyl ethoxysilane or F9) 3-aminopropyldimethyl methoxysilane, and the amino-functional polydiorganosiloxane has amino-functional pendant groups therefrom.

Starting Material G) Endblocker

The process for preparing the amino-functional organosilicon compound, such as the amino-functional polyorganosiloxane (prepared when starting material D-II) is used in the process described above) may optionally further comprise: adding starting material G), an endblocker. Without wishing to be bound by theory, it is thought that the endblocker may be used to cap some of the silanol groups on starting material D-II), for example, when an amino-functional polydiorganosiloxane to be prepared by the process described herein will have some trihydrocarbylsilyl-terminated (e.g., trialkyl-silyl terminated, such as trimethylsilyl-terminated) groups and some amino-functional groups. The endblocker is capable of reacting with a silanol group and generating an endblocking triorganosilyl unit where the triorganosilyl functionality is unreactive with the silanol groups of starting material A). Suitable endblockers are exemplified by (G1) a monoalkoxysilane, (G2) a silazane, or (G3) both (G1) and (G2).

The (G1) monoalkoxysilane may have formula (G4): $R^{16}_3SiOR^{17}$, where each $R^{16}$ is independently a monovalent organic group unreactive with silanol functionality and each $R^5$ is a monovalent hydrocarbon group of 1 to 6 carbon atoms. Alternatively, $R^{17}$ may be an alkyl group of 1 to 6 carbon atoms, alternatively 1 to 4 carbon atoms, alternatively 1 to 2 carbon atoms, and alternatively $R^{17}$ may be methyl. Each $R^{16}$ may be a monovalent hydrocarbon group selected from alkyl, alkenyl, and aryl groups. Alternatively, each $R^{16}$ may be an alkyl group of 1 to 6 carbon atoms, an alkenyl group of 2 to 6 carbon atoms or a phenyl group. Alternatively, each $R^{16}$ may be an alkyl group of 1 to 6 carbon atoms, alternatively 1 to 4 carbon atoms, and alternatively each $R^{16}$ may be methyl. Examples of monoalkoxysilanes for starting material (G1) include (G5) trimethylmethoxysilane and (G6) trimethylethoxysilane.

Suitable (G2) silazanes may have formula (G7): $(R^{18}R^{19}_2Si)_2NH$, where each $R^{18}$ is independently selected from a monovalent hydrocarbon group (as described herein for $R^8$) and a monovalent halogenated hydrocarbon group (such as a monovalent hydrocarbon group of $R^8$ wherein at least one hydrogen has been replaced with a halogen atom, such as Cl or F), each $R^{19}$ is an independently selected monovalent hydrocarbon group of 1 to 6 carbon atoms, as described above for $R^{17}$. Each $R^{18}$ may be an alkyl group, an alkenyl group, or a halogenated alkyl group. Suitable alkyl groups for $R^{18}$ include methyl, ethyl, propyl, and butyl. Suitable alkenyl groups include vinyl and allyl. Suitable halogenated alkyl groups include trifluoropropyl. Examples of suitable silazanes for starting material (G2) include (G8) hexamethyldisilazane, (G9) sym-tetramethyldivinyldisilazane, and (G10) $[(CF_3CH_2CH_2)(CH_3)_2Si]_2NH$.

The endblocker is optional, and the exact amount depends on various factors including the desired structure and amine content of the amino-functional polyorganosiloxane to be formed. However, the endblocker may be added in an amount up to 5%, alternatively 0.1% to 5%, based on combined weights of all starting materials used in the process. When present, all or a portion of starting material G) may be added in step 1). Alternatively, a first portion of starting material G) may be added in step 1) and a second portion of starting material G) may be added in an additional step added to the process after step 1) and before step 2).

Starting Material H) Solvent

The process for preparing the amino-functional organosilicon compound may optionally further comprise: adding starting material H), a solvent. The solvent may be as described above for starting material e) in the process for making the cyclic polysiloxazane. Without wishing to be bound by theory, it is thought that the solvent may be used to introduce one or more of the starting materials, such as starting material D-II) when a polysiloxane resin is selected therefor. The process may use 0% to 200% of solvent based on combined weights of all starting materials used in the process. Alternatively, 0% to 90% solvent (on the same basis) may be used. Whether a solvent is used depends on various factors including the selection of starting material D). For example, a solvent may be used when a silanol-functional polyorganosiloxane resin that is solid at RT is selected as starting material D). Alternatively, the process may be run neat when starting material D) is a silanol-functional silane and/or a silanol-functional polydiorganosiloxane that is a liquid at RT.

The process for preparing the amino-functional polyorganosiloxane may optionally further comprise one or more additional steps in addition to those described above. For example, the process may optionally further comprise: 4) removing residual acid (when E) the acid precatalyst is added) before and/or during step 2) recovering the amino-functional polyorganosiloxane from the reaction mixture. The amino-functional polyorganosiloxane may be recovered from the reaction mixture by any convenient means, such as stripping and/or distillation, optionally under vacuum. One or more of the process steps may be performed under an inert atmosphere, such as nitrogen.

The process for preparing the amino-functional polyorganosiloxane may optionally further comprise quenching unreacted cyclic polysiloxazane, unreacted silanol-functional polyorganosiloxane, or both. Quenching may be performed by adding a starting material selected from the group consisting of I) water, and B) an alcohol of formula $R^{10}OH$, where $R^{10}$ is an alkyl group of 1 to 8 carbon atoms. Quenching may be performed after step 1), alternatively, any time before step 2) in the process for preparing the amino-functional polyorganosiloxane.

B. Process for Making Alkoxy-Functional Capping Agent

Alternatively, the cyclic polysiloxazane described above may be further reacted to prepare an α-alkoxy-ω-amino-functional polysiloxane useful as a capping agent, e.g., before combining the capping agent with D) the silanol-functional organosilicon compound, such as D-II) the silanol-functional polyorganosiloxane, described above. A process for preparing the α-alkoxy-ω-amino-functional polysiloxane comprises:

I) combining starting materials comprising

A) the cyclic polysiloxazane prepared by the process described above, and

B) an alcohol of formula $R^{10}OH$, where $R^{10}$ is an alkyl group of 1 to 8 carbon atoms;

thereby preparing a reaction product comprising C) an α-alkoxy-ω-amino-functional polysiloxane of formula

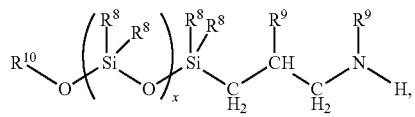

where each $R^8$, $R^9$, $R^{10}$, and subscript x are as described above; and optionally II) purifying the reaction product to recover C) the α-alkoxy-ω-amino-functional polysiloxane.

Alternatively, in the α-alkoxy-ω-amino-functional polysiloxane, each $R^8$ may be an alkyl group such as methyl, and each $R^9$ may be hydrogen. Starting material B) in this method, the alcohol, may be selected from the group consisting of methanol and ethanol.

The process described above produces a α-alkoxy-ω-primary amino-functional polysiloxane of formula:

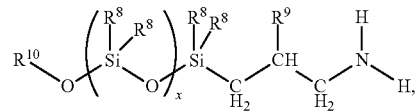

where each $R^8$, $R^9$, and $R^{10}$, and subscript x are as described above. Alternatively, each $R^8$ may be an independently selected alkyl group of 1 to 18 carbon atoms, alternatively methyl. Alternatively, each $R^9$ may be hydrogen. Alternatively, each $R^{10}$ may be methyl or ethyl.

C. Alternative Process for Making the Amino-Functional Polyorganosiloxane

The α-alkoxy-ω-amino-functional polysiloxane described above is useful in an alternative process for preparing an amino-functional organosilicon compound, which comprises:

1) combining starting materials comprising
the reaction product formed in step I) and/or C) the α-alkoxy-ω-amino-functional polysiloxane of formula

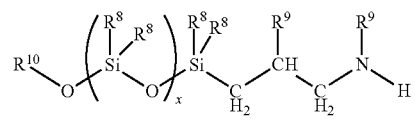

purified in step II) of the process described above; and

D) a silanol-functional organosilicon compound (as described above); thereby preparing a reaction mixture; optionally 2) heating the reaction mixture up to 150° C., alternatively up to 90° C., and alternatively 90° C. to 150° C.; and 3) adding E) an acid precatalyst to the reaction mixture. This process may optionally further comprise: 4) adding F) an aminoalkyl-functional alkoxysilane to the reaction mixture. Starting materials D), E), and F) and their amounts are as described above. Without wishing to be bound by theory, it is thought that adding starting material E) the acid precatalyst may be optional when the process is run at >90° C., and adding precatalyst is performed when the process is run at 90° C. or lower.

In the process for preparing the amino-functional organosilicon compound, mixing and heating may be performed using any convenient means, such as loading the starting materials into a vessel such as an agitated, jacketed batch reactor or reactive distillation apparatus having a jacketed reboiler, which jackets can be heated and cooled by passing steam/water or heat transfer fluid through the jacket. The starting materials and/or the reaction mixture may be kept at RT or heated up to 150° C., alternatively heated up to 90° C. to facilitate the reaction. The process is performed for a time sufficient to form the amino-functional organosilicon compound.

In steps 1) and 2), one of starting material A) and starting material D) may be added continuously or in increments into a vessel containing the other of starting material A) and starting material D). Such addition may be performed manually or using metering equipment.

The process described above may optionally further comprise one or more additional steps. The process may optionally further comprise step 4) adding an additional starting material to the reaction mixture in step 1) and/or step 2). The additional starting material may be selected from the group consisting of F) an aminoalkyl-functional alkoxysilane, G) an endblocker, H) a solvent, and a combination two or more of F), G), and H). Alternatively, step 4) may be performed during and/or after step 1), before and/or after step 2), or before and/or during step 3). Starting materials D), E), F), G), and H) are as described above. The process for preparing the amino-functional organosilicon compound may optionally further comprise quenching unreacted α-alkoxy-ω-amino-functional polysiloxane, unreacted silanol-functional organosilicon compound, or both. Quenching may be performed by adding a starting material selected from the group consisting of I) water, and B) an alcohol of formula $R^{10}OH$, where $R^{10}$ is an alkyl group of 1 to 8 carbon atoms. Quenching may be performed after step 1), alternatively, any time before recovering the amino-functional polyorganosiloxane. The amino-functional polyorganosiloxane may be recovered from the reaction mixture by stripping and/or distillation, optionally under vacuum. One or more of the process steps may be performed under an inert atmosphere, such as nitrogen. For example, steps 1) and 2) described above may optionally further comprise flowing inert gas through the vessel headspace. Without wishing to be bound by theory, it is thought that flowing inert gas through the reactor headspace may help to remove odors and low-boiling impurities from the system.

III. Amino-Functional Polyorganosiloxane

The processes described above produce an amino-functional polyorganosiloxane. When a silanol-terminated polydiorganosiloxane is used as starting material D-II), the amino-functional polyorganosiloxane is an amino-group-terminated polydiorganosiloxane. When each $R^9$ is hydrogen, then the amino-group-terminated polydiorganosiloxane is a primary amino-group-terminated polydiorganosiloxane of formula:

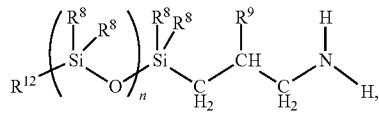

where $R^{12}$ is selected from the group consisting of OH, $R^8$, and $-CH_2CH(R^9)CH_2NH_2$ and subscript n=(x+y+1). Alternatively, $R^{12}$ may be selected from the group consisting of OH, $R^8$, and $-CH_2CH_2CH_2NH_2$ Alternatively, when a silanol-functional polysiloxane resin is used as starting material D), the amino-functional polyorganosiloxane is an amino-functional polyorganosiloxane resin. When each $R^9$ is hydrogen, then the amino-functional polyorganosiloxane resin is a primary amino-functional polyorganosiloxane resin. The primary amino-functional polyorganosiloxane resin may comprise unit formula:

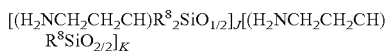

$[(H_2NCH_2CH_2CH)SiO_{3/2}]_L(R^{20}{}_3SiO_{1/2})_G(R^{20}{}_2SiO_{2/2})_H$ $(R^{20}SiO_{3/2})_F(SiO_{4/2})_D$, where $R^8$ and $R^{20}$ are as described above, subscript D is as described above, subscript G≤A, subscript H≤B, subscript F≤C. Subscript G≥0, subscript H≥0, subscript F≥0, subscript D≥0. A quantity (J+K+L)>1. A quantity (L+F+D)>1. A quantity (J+K+L+G+H+F+D) has a value sufficient to give the resin a Mn of 1,000 g/mol to 12,000 g/mol.

Personal Care Products

The amino-functional polyorganosiloxane (e.g., the amino-functional polydiorganosiloxane) described above may be formulated into personal care products. Generally, such products can be prepared at room temperature, if no materials which are solid at room temperature are present, using simple propeller mixers, Brookfield counter-rotating mixers, or homogenizing mixers. No special equipment or processing conditions are typically required. Depending on the type of form made, the method of preparation will be different, but such methods are known in the art.

The personal care products may be functional with respect to the portion of the body to which they are applied, cosmetic, therapeutic, or some combination thereof. Conventional examples of such products include, but are not limited to: antiperspirants and deodorants, skin care creams, skin care lotions, moisturizers, facial treatments such as acne or wrinkle removers, personal and facial cleansers, bath oils, perfumes, colognes, sachets, sunscreens, pre-shave and after-shave lotions, shaving soaps, and shaving lathers, hair shampoos, hair conditioners (either leave in or rinse off), hair colorants, hair relaxants, hair styling aids such as sprays, fixatives, mousses, and/or gels; permanents, depilatories, and cuticle coats, make-ups, color cosmetics, foundations, concealers, blushes, lipsticks, eyeliners, mascara, oil removers, color cosmetic removers, powders, medicament creams, pastes or sprays including dental hygienic, antibiotic, healing promotive, and/or nutritive, which may be preventative and/or therapeutic. In general the personal care products may be formulated with a carrier that permits application in any conventional form, including but not limited to liquids, rinses, lotions, creams, pastes, gels, foams, mousses, ointments, sprays, aerosols, soaps, sticks, soft solids, solid gels, and gels. What constitutes a suitable carrier would be apparent to one of ordinary skill in the art.

The amino-functional polyorganosiloxane can be used in a variety of personal, household, and healthcare applications. In particular, the amino-functional polydiorganosiloxane may be used in the personal care products disclosed in U.S. Pat. No. 6,051,216 to Barr et al.; U.S. Pat. No. 5,919,441 to Mendolia et al.; U.S. Pat. No. 5,981,680 to Petroff et al.; U.S. Patent Application 2010/0098648 to Yu; and WO 2004/060101 to Yu; in sunscreen compositions as disclosed in U.S. Pat. No. 6,916,464 to Hansenne et al.; in cosmetic compositions also containing film-forming resins, as disclosed in WO2003/105801 to Yu; in cosmetic compositions as disclosed in U.S. Patent Application 2003/0235553 to Lu, U.S. Patent Application 2003/0072730 to Tornilhac, U.S. Patent Application 2003/0170188 to Ferrari et al., EP 1,266,647 to Tornilhac, EP 1,266,648 to Ferrari, et al., EP1,266,653 to Ferrari et al., WO2003/105789 to Lu, WO2004/000247 to Lu and WO2003/106614 to Lu; as additional agents to those disclosed in WO2004/054523 to Tournilhac; in long wearing cosmetic compositions as disclosed in U.S. Patent Application Publication 2004/0180032; and in transparent or translucent care and/or make up compositions as discussed in WO 2004/054524; all of which are incorporated herein by reference.

Alternatively, the amino-functional polyorganosiloxane can be used as part of colorant or fixative compositions and applied as pre-, during-, post-treatment in the process of coloring or perming hair. The purposes could range from color retention and color enhancement to again conditioning of the colored hair fibers. Examples can be found in the patent publications U.S. Patent Application Publication 2003/0152534 to Legrand et al., U.S. Patent Application Publication 2003/0152541 to Legrand et al., U.S. Patent Application Publication 2003/0147840 to Legrand et al., U.S. Pat. No. 6,953,484 to Devin-Baudoin et al., U.S. Pat. No. 6,916,467 to Devin-Baudoin et al., U.S. Patent Application Publication 2004/0045098 to Devin-Baudoin et al., U.S. Patent Application Publication 2003/0126692 to Devin-Baudoin et al., PCT Publication WO2007/071684 to Audousset, and U.S. Patent Application Publication 2008/0282482 to Audousset, et al by L'Oreal and U.S. Pat. No. 7,335,236 to McKelvey by Noxell Corp., all of which are hereby incorporated herein by reference.

The personal care products according to this invention can be used by standard methods, such as applying them to the human body, e.g., skin or hair, using applicators, brushes, applying by hand, pouring them and/or possibly rubbing or massaging the product onto or into the body. Removal methods, for example for color cosmetics are also well known standard methods, including washing, wiping, and peeling. For use on the skin, the personal care products according to the present invention may be used in a conventional manner, for example, for conditioning the skin. An effective amount of the product for the purpose is applied to the skin. Such effective amounts generally range from 1 mg/cm$^2$ to 3 mg/cm$^2$. Application to the skin typically includes working the composition into the skin. This method for applying to the skin comprises the steps of contacting the skin with the composition in an effective amount and then rubbing the composition into the skin. These steps can be repeated as many times as desired to achieve the desired benefit.

The use of the personal care products according to the invention on hair may use a conventional manner for conditioning hair. An effective amount of the product for conditioning hair is applied to the hair. Such effective amounts generally range from 0.5 g to 50 g, alternatively from 1 g to 20 g. Application to the hair typically includes working the composition through the hair such that most or all of the hair is contacted with the product. This method for conditioning the hair comprises the steps of applying an effective amount of the hair care product to the hair, and then working the composition through the hair. These steps can be repeated as many times as desired to achieve the desired conditioning benefit.

Non-limiting examples of additives which may be formulated into the personal care products in addition to the amino-functional polyorganosiloxane include: (i) additional silicones, (ii) anti-acne agents, (iii) anti-carie agents, (iv) anti-dandruff agents, (v) anti-oxidants, (vi) biocides, (vii) botanicals, (viii) cleansing agents, (ix) colorants, (x) conditioning agents, (xi) deposition agents such as cationic deposition aids, (xii) electrolytes, (xiii) emollients, (xiv) exfoliating agents, (xv) foam boosters, (xvi) fragrances, (xvii) humectants, (xviii) occlusive agents, (xix) oils, (xx) pediculicides, (xxi) pH control agents, (xxii) pigments, (xxiii) preservatives, (xxiv) rheology-modifying agents, (xxv) solvents, (xxvi) stabilizers, (xxvii) stabilizing agents, (xxviii) sun-screening agents, (xxix) surfactants, (xxx) suspending agents, (xxxi) tanning agents, (xxxii) thickening agents, (xxxiii) vitamins, (xxxiv) waxes, (xxxv) wound healing-promotion agents, and (xxxvi) any two or more of (i) to (xxxv).

EXAMPLES

These examples are intended to illustrate the invention to one skilled in the art and are not to be interpreted as limiting the scope of the invention set forth in the claims. Table 2, below, show the starting materials used in these examples.

TABLE 2

Starting Materials In Examples for Making Cyclic Polysiloxazanes

| Starting Material | Description | Source |
|---|---|---|
| | allyl alcohol | Sigma-Millipore |
| | allyl amine | Sigma-Millipore, Acros Organics, U.S. Amines |
| | allyloxydimethylsilane | Prepared in house via a synthetic method derived from a method used in U.S. Pat. No. 9,381,506 and modified to use the solvent in Example 1 |
| | allyloxydiphenylsilane | Prepared in house via a synthetic method derived from report by Mironov, V. F.; Kozlikov, V. L; Fedotov, N. S., Zh. Org. Khim+, 1969, 39, 966. that used of NEt$_3$ instead of PhNMe$_2$. |
| | chloro-di-(2,4,6-trimethylphenyl)silane | Sigma-Millipore |
| MeSiCl2 | dichloromethylsilane | Sigma-Millipore |
| | 1,4-dioxane | Sigma-Millipore |
| | (NH$_4$)$_2$SO$_4$, ammonium sulfate | Sigma-Millipore |
| Solvent 1 | pentane | Sigma-Millipore |
| Karstedt's Catalyst | Pt (1,1,3,3-tetramethyl-divinyl-disiloxane complex) | Dow Silicones Corporation |
| Ashby's Catalyst | Pt (SiMeViO)$_4$ | Sigma-Millipore |
| TMDSO | 1,1,3,3-tetramethyl-disiloxane | Dow Silicones Corporation |
| Solvent 2 | toluene | Sigma-Millipore |
| TEA | triethylamine | Sigma-Millipore |
| | 2,4,6-triisopropylphenyl-magnesium bromide | Siqma-Millipore |

Part I. Synthesis of Cyclic Polysiloxazanes

In this Reference Example 1, promoter allyloxy-di-(2,4,6-trimethylphenyl)silane was synthesized, as follows. 5.1302 g of chloro-di-(2,4,6-trimethylphenyl)silane was added to a 250 mL flask and dissolved in 110 mL pentane. In a separate flask 1.0328 g allyl alcohol, 1.9709 g triethylamine were combined and mixed. The mixture was then added to the chloro-di-(2,4,6-trimethylphenyl)silane over 1 hour, and copious amounts of white precipitate formed. The flask contents were stirred for 2 hours. The solid material was filtered off, and the supernatant liquid was collected. The solids were washed with 10 mL of pentane, which was combined with the supernatant liquid. The low-boiling volatile components were stripped off under vacuum to give a hazy liquid, which was dissolved in 60 mL of pentane, filtered again, stripped and collected to give 4.7018 g of allyloxy-di-(2,4,6-trimethylphenyl)silane as a liquid. The product was characterized by $^1$H NMR, $^{29}$Si NMR, and GC-Mass Spec.

In this Reference Example 2, promoter allyloxy-methyl-(2,4,6-tri-isopropyl-phenyl)silane was synthesized as follows. 30 mL of toluene was added to a 250 mL, half-jacket flask cooled to ca. −11° C. 4.9554 g (43.1 mmol) of dichloromethylsilane was added. Next, 25 mL of 0.5 M 2,4,6-triisopropylphenylmagnesium bromide was slowly added to the flask over 45 minutes, which gave a pale yellow solution and a colorless precipitate. The contents of the flask were stirred cold for 1 hour and then warmed to ambient temperature, where the contents were stirred for another hour. Next, 3.2534 g of 1,4-dioxane was added to the flask. Copious amount of white precipitate formed, and the flask contents were stirred for 1 hour. Salts were filtered away from the supernatant liquid. The solid was washed with 30 mL of pentane which was combined with the other liquid. Volatile components were removed under vacuum to give 2.9466 g of white micro-crystalline solid. The product was identified as chloro-methyl-(2,4,6-tri-isopropyl-phenyl)silane. The product was characterized by $^1$H NMR, $^{29}$Si NMR, and GC-Mass Spec.

2.7908 g of chloro-methyl-(2,4,6-tri-isopropyl-phenyl)silane was added to a 250 mL half-jacket flask, dissolved in 40 mL pentane, and cooled to ca. 4° C. In a separate flask, 0.6016 g allyl alcohol, 1.078 g triethylamine, and 4.7 g of pentane were combined and mixed. The mixture was then added to the chloro-methyl-(2,4,6-tri-isopropyl-phenyl)silane over 25 minutes. During this time, the flask contents warmed to 9.8° C., and copious amounts of white precipitate formed. The flask contents warmed to ambient temperature and stirred for 2 hours. The solid material was filtered off, and the supernatant liquid was collected. The solids were washed with 10 mL of pentane, which was combined with the supernatant liquid. The low-boiling volatile components were stripped off under vacuum to give a hazy liquid which was filtered again and collected as allyloxy-methyl-(2,4,6-tri-isopropyl-phenyl)silane. The product was characterized by $^1$H NMR, $^{29}$Si NMR, and GC-Mass Spec.

In this Reference Example 3, promoter (1-methyl-2-propyn-1-yl)oxy-diphenylsilane was synthesized as follows. 9.9272 g of chlorodiphenylsilane was added to a 250 mL half-jacket flask, dissolved in 100 mL pentane, and cooled to ca. 1° C. In a separate flask, 3.222 g 1-methyl-prop-2-yn-1-ol, 4.6258 g triethylamine, and 3.0000 g of pentane were combined and mixed to give a yellow solution. The mixture was then added to the chlorodiphenylsilane over 30 minutes. During this time, the flask contents warmed to 8.9° C., and copious amounts of white precipitate formed. The flask contents warmed to RT temperature and stirred for 2 hours. The solid material was filtered off, and the supernatant liquid was collected. The solids were washed with 30 mL of pentane twice, and the washings were combined with the supernatant liquid. The low-boiling volatile components were stripped off under vacuum to give a hazy liquid. The liquid was then combined with 15 mL of pentane, agitated, and then filtered to give a clear liquid. The liquid was stripped under reduced pressure to give 10.2342 g of a pale yellow, clear liquid consisting of (1-methyl-2-propyn-1-yl) oxy-diphenylsilane. The product was characterized by $^1$H NMR, $^{29}$Si NMR, and GC-Mass Spec.

In this Reference Example 4, a Pt-Promoter catalyst solution was prepared by mixing a stock solution of a soluble platinum source, such as Karstedt's catalyst [Pt$_2$O (SiMeVi)$_3$], or Ashby's Catalyst [Pt(SiMeViO)$_4$], and a promoter at RT. Reactivity was evident due to a quick color change from either a colorless or pale yellow solution to typically an orange to dark red solution as well as an exotherm. The mixture was ready for use within 1 h to 3 days, depending on the promoter used. The mixture was characterized by $^1$H, $^{29}$Si, and $^{195}$Pt NMR. Combinations of Pt-promoter stock solutions evaluated are provided in Table 3 below.

TABLE 3

| Example | Promoter (from Table 1) | Pt Source | Mole Ratio of Promoter to Pt | Minimum Mixing Time Prior to Use | Solvent |
| --- | --- | --- | --- | --- | --- |
| 4a | AMM | 0.01M Karstedt's Catalyst | 4.5 | 1 h | Toluene |
| 4b | APP | 0.01M Karstedt's Catalyst | 5.5 | 1 h | Toluene |
| 4c | APP | 0.02M Karstedt's Catalyst | 3 | 1 h | Toluene |
| 4d | AEE | 2% Karstedt's Catalyst | 3 | 1 d | Xylenes |
| 4e | ATM | 0.02M Karstedt's Catalyst | 5.5 | 1 d | Toluene |
| 4f | M2APP | 0.02M Karstedt's Catalyst | 6.5 | 7 h | Toluene |
| 4g | M1PPP | 0.02M Karstedt's Catalyst | 3.5 | 1 d | Toluene |

In this Working Example 5: cyclic siloxazane of formula —SiMe$_2$OSiMe$_2$C$_3$H$_6$NH— was prepared by the process of this invention where the mole ratio of allylamine to TMDSO was 2:1 or greater and the TMDSO was added to the allylamine. Quantities are given in the Table below. First, a Pt-Promoter solution was mixed with the allylamine and any solvent at RT in a glass reaction flask with a thermocouple, magnetic stir bar, and a condenser cooled to between −5° C. to −20° C. The allylamine/catalyst solution was then heated to reflux temperature. The TMDSO was fed into the mixture over time and produced copious amounts of hydrogen within moments after addition, typically less than 5 seconds. The solution temperature gradually increased during the addition of TMDSO and also when feeding the TMDSO was halted as long as heat is put into the system. After feeding TMDSO was complete, the mixture was set to a temperature and stirred for 1 hour to 5 hours and then cooled to RT. The product, cyclic siloxazane, —SiMe$_2$OSiMe$_2$C$_3$H$_6$NH—, was characterized by GC-FID, GC-MS, $^1$H NMR and/or $^{29}$Si NMR. The cyclic siloxazane, —SiMe$_2$OSiMe$_2$C$_3$H$_6$NH—, was purified by a distillation method as described in EP 0 342 518 A2 and gave isolated yields of 65% to 85%.

TABLE 4

Combinations of Pt-Promoter catalyst mixed with a 2+:1 ratio of allylamine and TMDSO

| Ex. | Promoter | Promoter Load (g) | Promoter in Stock (g) | Pt Source | Vol. of Pt Stock | Pt in Stock (ppm) | Stock Added (g) | Promoter to Pt Ratio | Pt Loading (ppm) | Promoter Conc. in Rxn (ppm) |
|---|---|---|---|---|---|---|---|---|---|---|
| 5a | APP | 0 | 0.3915 | Karstedt in Toluene | 34 | 3828 | 2 | 3.0 | 156.1 | 469 |
| 5b | ATM | 0.2024 | | Ashby's Catalyst in D4-vinyl | 1.0181 | 20290 | 0.0232 | 0.0 | 38.9 | 0 |
| 5c | M1PPP | | 0.0284 | Karstedt in Toluene | 2.0057 | 3828 | 0.253 | 3.7 | 40.8 | 151 |

| Example | TMDSO (g) | Allylamine (g) | Reagent | Mole Ratio AA to TMDSO | Feed Time (h) | Initial Temp. (° C.) | Max Temp. (° C.) | Post Feed Mixing (h) | Post Feed Temp. (° C.) |
|---|---|---|---|---|---|---|---|---|---|
| 5a | 23.18 | 23.874 | 3-7010 | 2.42 | 4 | 55 | 71.9 | 1.1 | 70 |
| 5b | 6.00 | 5.8806 | 3-7010 | 2.31 | 1.5 | 52.2 | 103.7 | 4.5 | 103.7 |
| 5c | 11.76 | 11.7522 | 3-7010 | 2.35 | 3 | 53.3 | 81 | 4 | 81 |

In this Working Example 6 a cyclic siloxazane of formula —SiMe$_2$OSiMe$_2$C$_3$H$_6$NH— was prepared by the process of this invention where the mole ratio of allylamine to TMDSO was 1:1 to less than 1:2, and the TMDSO was added to the allylamine. Quantities are given in the Table below. First, a Pt-Promoter solution was mixed the allylamine and any solvent at ambient temperature in a glass reaction flask with a thermocouple, magnetic stir bar, and a condenser cooled to −5° C. to −20° C. The allylamine/catalyst solution was then heated to reflux temperature. The TMDSO was fed into the mixture over time and produced copious amounts of hydrogen within moments after addition, typically less than 5 seconds. The solution temperature gradually increased during the addition of TMDSO until reaching a temperature of 70° C. to 110° C. but also when feeding the TMDSO was halted as long as heat was put into the system. After feeding TMDSO was complete, the mixture was set to a temperature of 60° C. to 120° C. and stirred for 30 minutes to 8 hours, and then cooled to RT. The product, cyclic siloxazane, —SiMe$_2$OSiMe$_2$C$_3$H$_6$NH—, was characterized by GC-FID, GC-MS, $^1$H NMR and/or $^{29}$Si NMR. The cyclic siloxazane, —SiMe$_2$OSiMe$_2$C$_3$H$_6$NH—, was purified by a distillation method as described in EP 0 342 518 A2, which gave isolated yields of 65% to 85%.

TABLE

Combinations of Pt-Promoter catalyst mixed with a 1:1 to 1.25:1 ratio of allylamine and TMDSO

| Ex. | Promoter | Promoter Loading (g) | Promoter in Stock | Pt Type | Vol. of Pt Stock | Pt in Stock (ppm) | Stock Added (g) | Promoter to Pt Ratio | Pt Loading (ppm) | Promoter Conc. in Rxn (ppm) |
|---|---|---|---|---|---|---|---|---|---|---|
| 6a | AMM | 0.216 | | Karstedt in Toluene | | 1952 | 0.5 | 447.2 | 46.3 | 20694 |
| 6b | APP | | 0.1150 | Karstedt in Toluene | 6 | 1914 | 1 | 10.0 | 103.7 | 1038 |
| 6c | APP | | 0.0644 | Karstedt in Toluene | 6 | 1914 | 1 | 5.6 | 102.8 | 576 |
| 6d | AMM | | 0.0501 | Karstedt in Toluene | 6 | 1914 | 1 | 4.4 | 103.0 | 449 |
| 6e | APP | | 0.0644 | Karstedt in Toluene | 6 | 1914 | 2 | 5.6 | 53.1 | 298 |
| 6f | APP | | 0.3915 | Karstedt in Toluene | 34 | 3828 | 1 | 3.0 | 121.9 | 367 |
| 6g | ATM | | 0.0858 | Karstedt in Toluene | 4 | 3828 | 0.5 | 5.6 | 54.1 | 303 |
| 6h | AEE | | 0.0616 | Karstedt in Toluene | 1.0079 | 20000 | 0.11 | 3.1 | 62.7 | 192 |
| 6i | M1PPP | | 0.0284 | Karstedt in Toluene | 2.0057 | 3828 | 0.253 | 3.7 | 27.4 | 102 |
| 6j | M1PPP | | 0.0284 | Karstedt in Toluene | 2.0057 | 3828 | 0.87 | 3.7 | 15.8 | 59 |
| 6k | M1PPP | | 0.3915 | Karstedt in Toluene | 34 | 3828 | 4.35 | 3.0 | 65.7 | 198 |
| 6l | M1PPP | | 0.3915 | Karstedt in Toluene | 34 | 3828 | 0.087 | 3.0 | 23.3 | 70 |
| 6m | M1PPP | | 0.1362 | Karstedt in Toluene | 2.0032 | 20000 | 0.4875 | 3.4 | 31.9 | 108 |
| 6n | M1PPP | | 0.1362 | Karstedt in Toluene | 2.0032 | 20000 | 0.61 | 3.4 | 39.8 | 135 |
| 6o | APP | | 1.2126 | Karstedt in Toluene | 6.1012 | 20000 | 0.8073 | 9.9 | 32.7 | 325 |
| 6p | M2APP | | 0.0250 | Karstedt in Toluene | 1.01 | 3828 | 0.35 | 6.5 | 74.3 | 480 |

| | Solvent | Solvent Loading (g) | TMDSO (g) | Allylamine (g) | Mole Ratio AA to TMDSO | Feed Time (h) | Initial Temp. (° C.) | Max Temp. (° C.) | Post Feed Mixing (h) | Post Feed Temp. (° C.) |
|---|---|---|---|---|---|---|---|---|---|---|
| 6a | Tetra-glyme | 2.8078 | 11.59 | 5.9775 | 1.21 | 1.9 | 55.7 | 100.7 | 0.9 | 95 |
| 6b | | | 11.67 | 5.798 | 1.17 | 2 | 54.3 | 88 | 0.5 | 85 |
| 6c | | | 11.69 | 5.9301 | 1.19 | 2.1 | 54.2 | 82 | 1.5 | 82 |
| 6d | | | 11.61 | 5.9701 | 1.21 | 3 | 54.3 | 83.4 | 0.6 | 82 |
| 6e | | | 46.16 | 23.916 | 1.22 | 7.5 | 54.5 | 82 | NA | 80 |
| 6f | | 12.88 | 11.54 | 5.98 | 1.22 | 5 | 52.7 | 79.5 | 0.5 | 70 |
| 6g | | | 23.10 | 11.76 | 1.20 | 6 | 54.1 | 78.6 | 0.75 | 70 |
| 6h | | | 23.14 | 11.7777 | 1.20 | 8.25 | 53 | 82.3 | | |

TABLE-continued

Combinations of Pt-Promoter catalyst mixed with a 1:1 to 1.25:1 ratio of allylamine and TMDSO

| | | | | | | | | |
|---|---|---|---|---|---|---|---|---|
| 6i | 23.28 | 11.7522 | 1.19 | 11 | 53.3 | 84.6 | 0.6 | 107 |
| 6j | 142.08 | 67.39 | 1.12 | 9 + 10 = 19 (two separate days) | 53.5 | 110 | 1 | 110 |
| 6k | 168.92 | 80.06 | 1.12 | 13.5 | 53.8 | 83 | 0 | |
| 6l | 9.28 | 4.9172 | 1.25 | | 62.5 | 130 | | |
| 6m | 208.03 | 97.26 | 1.10 | 12.5 | 53.5 | 94.5 | | 110 |
| 6n | 212.80 | 93.2671 | 1.03 | 10.5 | 52.9 | 85 | 2.5 | 100 |
| 6o | 343.70 | 149.9 | 1.03 | 15 | 51.8 | 87.7 | 6 | 95 |
| 6p | 11.67 | 6.02 | 1.21 | 3 | 51.3 | 82 | 1 | 75 |

In this Comparative Example 7, an example from EP 0 342 518 A2 failed to complete a 1:1 TMDSO to allylamine process safely or with any reasonable yield. The report stated "Allylamine and TMDS (TMDSO) in a 1:1 molar ratio were combined with 40 ppm. of catalyst in a nitrogen atmosphere, whereupon hydrogen evolution was immediately observed. The mixture was heated to reflux and the pot temperature rose from 43° C. to 73° C. over 65 minutes; an exothermic reaction then occurred which caused an immediate rise to 155° C. The mixture was cooled to 45° C. and distilled under vacuum, yielding a very small proportion of cyclic disiloxazane. The distillation residue was steam distilled and shown to be a mixture of bis(3-aminopropyl) polydimethylsiloxanes."

In this Comparative Example 8 slow addition of TMDSO to allylamine containing a ca. 100 ppm Pt(SiMeViO)$_4$ catalyst did not give a complete reaction and instead produced little product past 55% conversion even after 6 hours of mixing, and instead began to precipitate a fine black powder. GC-FID confirmed incomplete conversion to the cyclic siloxazane.

In this Working Example 9: cyclic siloxazane of formula —SiMe$_2$OSiMe$_2$C$_3$H$_6$NH— was prepared by the process of this invention where TMDSO, a Pt catalyst, and a promoter were added to an appropriately sized glass reaction flask with a thermocouple, magnetic stir bar, and a condenser cooled to −5° C. to −20° C. The solution was heated to a temperature of 40° C. to 75° C. Quantities are given in the Table below. The Pt catalyst and Promoter were either mixed together prior to addition with the TMDSO or added individually to the TMDSO. The combination of reagents turned the solution yellow. The allylamine was fed into the mixture over time and produced copious amounts of hydrogen within moments after addition, typically less than 5 seconds. There was also an exotherm that was controlled by the rate of feeding the allylamine and cooling through the walls of the reaction flask. The reaction flasks temperature was maintained at a temperature of 50° C. to 110° C. by controlling the exotherm and by putting heat into the system after feeding the TMDSO was halted. After feeding TMDSO was complete, the mixture was set to a temperature of 60° C. to 120° C. and stirred for 30 minutes to 4 hours, and then cooled to RT. The product, cyclic siloxazane, —SiMe$_2$OSiMe$_2$C$_3$H$_6$NH—, was characterized by GC-FID, GC-MS, $^1$H NMR and/or $^{29}$Si NMR. The cyclic siloxazane, —SiMe$_2$OSiMe$_2$C$_3$H$_6$NH—, is purified by a distillation method as described in EP 0 342 518 A2 and gave isolated yields of 65% to 85%.

| Example | Promoter | Promoter Loading (g) | Promoter in Stock | Pt Type | Vol. of Pt Stock | Pt in Stock (ppm) | Stock Added (g) | Promoter to Pt Ratio | Pt Loading (ppm) | Promoter Conc. in Rxn (ppm) |
|---|---|---|---|---|---|---|---|---|---|---|
| 9a | AMM | 0.263 | | Karstedt in Toluene | | 1951 | 1 | 136.4 | 85.7 | 11689 |
| 9b | AMM | 0.344 | | Karstedt in Toluene | | 1951 | 1 | 179.5 | 100.0 | 17954 |
| 9c | AMM | 0.234 | | Karstedt in Toluene | | 1951 | 1 | 121.4 | 103.5 | 12566 |
| 9d | AMM | 0.281 | | Karstedt in Toluene | | 1951 | 2 | 36.5 | 199.2 | 7278 |
| 9e | AMM | 0.61 | | Karstedt in Toluene | | 1951 | 1 | 323.3 | 105.1 | 33983 |
| 9f | AMM | 0.283 | | Karstedt in Toluene | | 1951 | 1 | 146.9 | 88.3 | 12973 |
| 9g | AMM | 0.255 | | Karstedt in Toluene | | 1951 | 1 | 131.9 | 71.2 | 9387 |
| 9h | AMM | 0.336 | | Karstedt in Toluene | | 1952 | 5 | 7.0 | 426.6 | 2981 |
| 9i | CMM | 0.325 | | Karstedt in Toluene | | 1952 | 0.5 | 678.2 | 54.2 | 36741 |
| 9j | M2AMM | 0.229 | | Karstedt in Toluene | | 1952 | 1 | 118.8 | 106.5 | 12653 |
| 9k | APP | 0.2997 | | Karstedt in Toluene | | 1952 | 1 | 156.1 | 106.4 | 16600 |
| 9l | APP | | 0.1150 | Karstedt in Toluene | 6 | 1914 | 0.5 | 10.0 | 52.3 | 523 |

| Example | Solvent | Solvent Loading (g) | TMDSO (g) | Allylamine (g) | Mole Ratio AA to TMDSO | Feed Time (h) | Initial Temp. (° C.) | Max Temp. (° C.) | Post Feed Mixing (h) | Post Feed Temp. (° C.) |
|---|---|---|---|---|---|---|---|---|---|---|
| 9a | | | 11.50 | 10 | 2.05 | 1.85 | 60 | 74.4 | 0.5 | 60 |
| 9b | | | 11.43 | 6.73 | 1.39 | 1 | 60 | 76 | 1 | 60 |
| 9c | | | 11.40 | 6.22 | 1.28 | 0.6 | 60.4 | 90.9 | 1 | 60 |
| 9d | | | 11.40 | 5.9 | 1.22 | 1 | 60 | 85.9 | 0.3 | 75 |
| 9e | | | 11.41 | 5.54 | 1.14 | 1 | 60 | 82.6 | 1.25 | 60 |
| 9f | | | 11.43 | 9.385 | 1.93 | 1 | 60 | 70 | 1 | 70 |
| 9g | Toluene | 8.6 | 11.43 | 6.135 | 1.26 | 1 | 29.8 | 38.3 | 3 | 40 |
| 9h | | | 11.46 | 6.08 | 1.25 | 5 | 60 | 62 | 1 | 60 |
| 9i | | | 11.46 | 5.7311 | 1.18 | 0.67 | 60 | 70 | 0.5 | 70 |
| 9j | | | 11.54 | 5.563 | 1.13 | 0.75 | 70.1 | 80.6 | 1.25 | 70 |
| 9k | | | 11.56 | 5.49 | 1.12 | 1.5 | 70 | 88.8 | 1.5 | 70 |
| 9l | | | 11.81 | 6.0003 | 1.19 | 1.25 | 66.9 | | 1 | 65 |

In this Comparative Example 10, a cyclic siloxazane of formula —SiMe$_2$OSiMe$_2$C$_3$H$_6$NH— was synthesized by the process similar to that described in U.S. Pat. No. 5,026,890, but with several changes, as follows. To a 250 mL flask with glass thermowell and a chilled reflux condenser were added 0.0224 g of 0.104 M Pt(SiMeViO)$_4$ (ca. 2% Pt) and 5.8641 g allyl-amine. The mixture was heated to reflux ($\Delta_0$=53.4° C.). 6.8820 g of 1,1,3,3-tetramethyldisiloxane (TMDSO) was added in small aliquots to try and minimize the amount of the non-hydrosilylated intermediate (NHI) of formula H$_2$C=CHCH$_2$NHSiMe$_2$OSiMe$_2$H. This process step deviated from the examples in U.S. Pat. No. 5,026,890 where TMDSO was added in one aliquot. The reason for this change was that the bulk addition of the TMDSO to allyl-amine would generate a quantitative amount of flammable, non-compressible hydrogen gas, which would be untenable in a large manufacturing reactor due to safety concerns associated with the enormous, spontaneous pressure increase and limited venting for safe handling of the toxic allyl-amine amine. As the TMDSO was added, the reflux temperature slowly rose. After 3 h, ca. 70% of the TMDSO had been added and the temperature rose to 61.5° C. The flask contents were analyzed by GC that showed predominantly the NHI was formed with only about 4[RB(1)]% conversion to hydrosilylated cyclic —SiMe$_2$OSiMe$_2$C$_3$H$_6$NH—.

The heating was discontinued overnight and the solution was stirred overnight at ambient temperature. The next day, the heating to reflux was resumed. After 1.5 h, the remaining TMDSO was added and heating continued for another 9.5 h where the temperature rose to 73.9° C. The heating was discontinued, and the solution was stirred overnight at RT.

The next day, the solution was heated to reflux for 9 h where it reached 106.1° C. This also deviated from the process described in U.S. Pat. No. 5,026,890 where the process was run during one block of heating. The heat source was removed due to safety reasons of leaving unreacted components at elevated temperature, and the experiment already demonstrated poor conversion. Additional time to complete the process demonstrated unreliability and sluggishness in the process described in U.S. Pat. No. 5,026,890. Analysis by GC showed that 95+% of the NHI had been converted to the cyclic siloxazane of formula —SiMe$_2$OSiMe$_2$C$_3$H$_6$NH—. This comparative example showed that the process of U.S. Pat. No. 5,026,890 was unsuitable for commercial scale operations due to safety concerns and insufficient conversion achieved during desired reaction time.

In this Working Example 11: cyclic siloxazane of formula —SiMe$_2$OSiMe$_2$C$_3$H$_6$NH— was prepared by the process of this invention as follows. First, ca. 0.1284 g of a solution containing 0.02 M Pt(1,1,3,3-tetramethyl-divinyl-disiloxane complex) and allyloxydiphenylsilane (prepared as described in Reference Example 5) was added to 5.8710 g of allylamine in a 250 mL flask with glass thermowell and a chilled reflux condenser. The mixture was heated to reflux ($\Delta_0$=53.2° C.). 6.8902 g of TMDSO was added in small aliquots to the flask. After 2 hours, ca. 70 of the TMDSO had been added and the temperature rose to 65.4° C. The solution was allowed to cool to ambient temperature and analyzed by GC-FID which showed that 95+% of the NHI had been converted to the cyclic siloxazane. The solution was then heated back to reflux, the remaining TMDSO was added over 10 minutes, and the solution continued to heat to 106.6° C. over 35 more minutes. The solution was analyzed by GC. The solution was then heated to 110° C. to 115° C. for 1 h and then cooled. No observable amount of the NHI was observable in the GC.

Comparative Example 10 and Working Example 11 showed that when a hydrosilylation reaction promoter was used in conjunction with the hydrosilylation reaction catalyst, the process for making the cyclic siloxazane of formula —SiMe$_2$OSiMe$_2$C$_3$H$_6$NH— had higher yield in a shorter amount of time than the process similar to that disclosed in U.S. Pat. No. 5,026,890. This was demonstrated by the near complete conversion to the cyclic siloxazane within 3 hours in Working Example 11 versus the sluggish reaction in Comparative Example 10; furthermore, this was far shorter still than the process presented in U.S. Pat. No. 5,026,890, Example 9, where after 6 hours of reacting after complete addition of TMDSO to allyl-amine, the only reaction product identified was the NHI. While other Examples in U.S. Pat. No. 5,026,890 gave up to 95% yield of distilled cyclic siloxazane, Example 9 in U.S. Pat. No. 5,026,890 only gave 53% of theoretical for the isolated yield. Assuming 77% isolated yield of the cyclic siloxazane, —SiMe$_2$OSiMe$_2$C$_3$H$_6$NH—, from the process disclosed in this patent, and the improved volume efficiency of not needing to account for extra allyl-amine, this invention resulted in a 5% to 85% yield improvement over the process in U.S. Pat. No. 5,026,890 depending on an isolated yields of 95% and 53%, respectively.

In this Working Example 12, cyclic —SiMe$_2$OSiMe$_2$C$_3$H$_6$NH— was synthesized using allyloxydiphenylsilane as promoter, and an attempt was made to reuse catalyst. To a 250 mL 1-neck flask with a fused glass thermowell was added 23.8742 g of allylamine, 2 mL of the Pt-allyloxy-di-(2,4,6-trimethylphenyl)silane catalyst solution from Reference Example 4 was then added, and the resulting mixture was heated to reflux. 11.5962 g of TMDSO was added over 1.5 hours. A gas was generated during and after the addition. The solution was stirred for 20 minutes, and then a GC sample was collected. Another 11.5811 g of TMDSO was added over 2 hours heating no higher than 72° C. A gas was generated during and after addition. The pot temperature was held at ca. 70° C. for 1 hour and then cooled to ambient temperature. A GC sample was collected.

The reflux condenser was replaced with a 15 cm Vigreux column with a chilled distillation head and 100 mL receiving flask. The temperature was raised to 87° C. at ambient pressure to collect an initial portion of allylamine (to be recycled in next batch). During collection of allylamine, the temperature rose to 94° C. The distillation apparatus was then evacuated and sealed which resulted in more allylamine being distilled for reuse. 0.0586 g of (NH$_4$)$_2$SO$_4$ was added to the pot at 87° C., stirred for 10 minutes, and then distillation resumed with heating under vacuum. Product was collected over 2 hours in an 85% yield.

A chilled reflux condenser was attached to the pot, and 5.5614 g of allylamine was added and heated to reflux. 5.7376 g of TMDSO was added over 1.5 hours. A gas was generated during and after the addition. The solution heated gradually to 68.2° C. After completing addition, the solution was stirred for 10 minutes and then subsequently cooled to RT. A GC showed that more cyclic —SiMe$_2$OSiMe$_2$C$_3$H$_6$NH— was generated.

This Working Example 12 shows that the catalyst and promoter could be re-used in the process described herein when there is a phenyl group directly bonded to the silicon atom of the promoter. An attempt to reuse the residual catalyst from a pot residue originating from distilling cyclic —SiMe$_2$OSiMe$_2$C$_3$H$_6$NH—, generated in a process that used an alternative hydrosilylation reaction promoter, allyloxy-dimethylsilane (AMM), but was unsuccessful and further hydrosilylation was not observed when allylamine and TMDSO were combined with the pot residue. This was confirmed through GC-FID analysis. The key difference was the use of bulky phenyl groups instead of methyl groups on the hydrosilylation promoter which were believed to impart stability to the catalyst. Without wishing to be bound by theory, it is thought that the use of bulkier organic groups bound to a metal catalyst can impart improved thermal stability.

In this Comparative Example 13, a cyclic siloxazane of formula —SiMe$_2$OSiMe$_2$C$_3$H$_6$NH— was attempted to be synthesized using acetoxy-dimethylsilane as a hydrosilylation reaction promoter. The acetoxy-dimethylsilane was combined with the tetramethyldisiloxane and Pt(1,1,3,3-tetramethyl-divinyl-disiloxane complex) at RT. After initially adding allylamine, a white precipitate, formed and no cyclic —SiMe$_2$OSiMe$_2$C$_3$H$_6$NH— was observed being formed according to GC analysis.

In this Working Example 15, cyclic —SiMe$_2$OSiMe$_2$CH$_2$CH(CH$_3$)CH$_2$NH— was synthesized using (1,1-dimethyl)allyloxy-diphenylsilane as hydrosilylation reaction promoter. To a 250 mL 1-neck flask with a fused glass thermowell was added 5.32 g of 2-methyl-allylamine, 0.25 g of a Pt-(1,1-dimethyl)allyloxy-diphenylsilane catalyst solution was then added (which would give ca. 60 ppm Pt and 400 ppm promoter in the final solution mixture) and the resulting mixture was heated to 62° C. 10.05 g of TMDSO was added over 3.5 hours where the temperature gradually increased to 77° C. A gas was generated during and after the addition. The solution temperature was then increased to 80° C. and stirred for 1 hour, and then allowed to cool to ambient temperature. The crude product, cyclic —SiMe$_2$OSiMe$_2$CH$_2$CH(CH$_3$)CH$_2$NH—, was analyzed by GC-FID and GC-MS.

The reflux condenser was replaced with a 15 cm Vigreux column with a chilled distillation head and 100 mL receiving flask. The vessel was stripped at 50° C. to remove low-boiling components and then 0.07 g of (NH$_4$)$_2$SO$_4$ was added to the pot at ambient temperature and the product, cyclic —SiMe$_2$OSiMe$_2$CH$_2$CH(CH$_3$)CH$_2$NH—, was distilled under vacuum between 70 to 115° C. to give 8.66 g (61% yield) at 99+% yield. The product was characterized by GC-FID, GC-MS, $^1$H NMR, $^{13}$C NMR, and $^{29}$Si NMR.

In this Comparative Example 16, an attempt was made to synthesize cyclic —SiMe$_2$OSiMe$_2$CH$_2$CH$_2$CH$_2$CH$_2$NH— by combining starting materials in a manner similar to Example 12 using the isomer 1-amino-but-3-ene instead of 2-methyl-allylamine. To a 250 mL 1-neck flask with a fused glass thermowell was added 6.18 g of 1-amino-but-3-ene, 0.35 g of a Pt-(1,1-dimethyl)allyloxy-diphenylsilane catalyst solution was then added (which would give ca. 75 ppm Pt and 500 ppm promoter in the final solution mixture) and the resulting mixture was heated to ca. 75° C. 11.67 g of TMDSO was added over 2 hours. A gas was generated during and after the addition. The solution temperature was then increased to 80° C. and stirred for 2 hours, and the product mixture was analyzed by GC-FID and GC-MS which gave no evidence for the formation of cyclic —SiMe$_2$OSiMe$_2$CH$_2$CH$_2$CH$_2$CH$_2$NH—.

In this Working Example 17, cyclic —SiMe$_2$OSiMe$_2$CH$_2$CH$_2$CH$_2$NMe- was synthesized using (1-methyl-2-propyn-1-yl)oxy-diphenylsilane(M1PPP) as a hydrosilylation promoter. 4.92 g of N-methyl-allylamine and 0.087 g of the Pt/M1PPP promoter catalyst solution from Example 4g (which gave ca. 23 ppm Pt and 70 ppm promoter in the final solution mixture) were added to a 250 mL 1-neck flask with a fused glass thermowell and a reflux condenser. The solution was heated to 62.5° C. 9.28 g of TMDSO was added over 3 hours where the temperature gradually increased to 92° C. A gas was generated during and after the addition. The solution temperature was then increased to 80° C. and stirred for 1 hour, and then allowed to cool to ambient temperature. The crude product contained cyclic —SiMe$_2$OSiMe$_2$CH$_2$CH$_2$CH$_2$NMe-, which was characterized by GC-FID and GC-MS. In theory, this material could be purified by a distillation process.

In this Working Example 18, cyclic —SiMe$_2$OSiMe$_2$OSiMe$_2$CH$_2$CH$_2$CH$_2$NH— was synthesized using allyloxy-diphenylsilane (APP) as a hydrosilylation promoter. 11.58 g of allylamine and 0.3 g of the Pt/APP promoter catalyst solution from Example 4c (which gave ca. 22 ppm Pt and 65 ppm promoter in the final solution mixture) were added to a 250 mL 1-neck flask with a fused glass thermowell and a reflux condenser. The solution was heated to 52.7° C. 41.07 g of 1,1,3,3,5,5-hexamethyltrisiloxane (HMTSO) was added over 7.5 hours to the reaction mixture where the temperature gradually was increased to 82.4° C. The solution was then heated to ca. 95° C. for 30 minutes and then allowed to cool to ca. 67° C. where it was held for 1.5 hours. A gas was generated during and after the addition. The solution temperature was then increased to 80° C. and stirred for 1 hour, and then allowed to cool to ambient temperature. The crude product contained cyclic —SiMe$_2$OSiMe$_2$OSiMe$_2$CH$_2$CH$_2$CH$_2$NH—, which was characterized by GC but only gave low yields (<25%) with the majority of the material converting into the product of allylamine undergoing a hydrosilylation reaction on both SiH moieties on the trisiloxane, HSiMe$_2$OSiMe$_2$OSiMe$_2$H, to give H$_2$NCH$_2$CH$_2$CH$_2$SiMe$_2$OSiMe$_2$SiMe$_2$CH$_2$CH$_2$CH$_2$NH$_2$ as the major product. In theory, cyclic —SiMe$_2$OSiMe$_2$OSiMe$_2$CH$_2$CH$_2$CH$_2$NH—, could be purified by a distillation process.

Part II. Preparing an Amino-Functional Polyorganosiloxane

TABLE 2

Starting Materials Used in Examples for Preparing An Amino-Functional Polyorganosiloxane

| Starting Material | Description | Source |
|---|---|---|
| MQ 1 Resin | MQ resin solution in xylenes with a ratio of M units/Q units (M/Q ratio) of 0.78, hydroxyl content of 15 mole % as determined by $^{29}$Si NMR and a weight average molecular weight of 8,750 Dalton as measured by triple detection GPC. | Dow Silicones Corporation |
| EtOH | ethanol | |
| MeOH | methanol | |
| | 2-propanol | |
| condensation catalyst | propionic acid | |
| OH-PDMS 1 | bis-silanol-terminated polydimethyl-siloxane with a viscosity of 70 mPa · s measured as described below | Dow Silicones Corporation |
| OH-PDMS 2 | bis-silanol-terminated polydimethyl-siloxane with an average Mw of 1,000 | |
| OH-PDMS 3 | bis-silanol-terminated poly-dimethylsiloxane (Mw = 3100) phenyl-methylsiloxane containing | |

TABLE 2-continued

Starting Materials Used in Examples for Preparing An Amino-Functional Polyorganosiloxane

| Starting Material | Description | Source |
|---|---|---|
| T-Phenyl Resin | principally 1,3-dimethyl-1,3-diphenyl-disiloxane-1,3-diol polyphenylsilsesquioxane resin with a hydroxyl content of 60 mole % measured by $^{29}$Si NMR | DOWSIL™ 217 Resin |
| HMDZ | hexamethyldisilazane HPLC grade xylenes | DOWSIL™ Z-6079 Fluid |

Starting materials in Table 2 with DOWSIL™, SYL-OFF™, and SILASTIC™ brands are commercially available from Dow Silicones Corporation of Midland, Mich., USA.

In this Working Example I, a single source of cyclic —SiMe$_2$OSiMe$_2$C$_3$H$_6$NH— in a solution of MeOH was converted to MeO—SiMe$_2$OSiMe$_2$C$_3$H$_6$NH$_2$ as follows. To a 250 mL, 1-neck flask with a fused-glass thermowell was added 75.75 g of a crude mixture consisting of ca. 55% cyclic —SiMe$_2$OSiMe$_2$C$_3$H$_6$NH— with the remainder consisting of hydrocarbon and siloxane materials as well as trace quantities of platinum. A condenser was added to the top of the flask and cooled to ca. −15° C. ca. 61.0 mL of methanol was added to the flask over 30 minutes resulting in a gradual exotherm of 21.3° C. The solution was refluxed around 72° C. for 7 hours.

In this Working Example II, the MeO—SiMe$_2$OSiMe$_2$C$_3$H$_6$NH$_2$ was purified via distillation. The condenser on the flask from Working Example I was replaced with a 15 cm Vigreux column, a distillation head, and receiving flask. The flask was heated to ca. 115° C. with no vacuum to remove excess methanol and other components with a boiling point below MeO—SiMe$_2$OSiMe$_2$C$_3$H$_6$NH$_2$. MeO—SiMe$_2$OSiMe$_2$C$_3$H$_6$NH$_2$ was collected under vacuum from −20 in Hg to −28 in Hg heated up to ca. 130° C. ca. 38% of the theoretical yield of MeO—SiMe$_2$OSiMe$_2$C$_3$H$_6$NH$_2$ was collected.

In this Working Example III, a single source of cyclic —SiMe$_2$OSiMe$_2$C$_3$H$_6$NH— in a solution of EtOH was converted to EtO-SiMe$_2$OSiMe$_2$C$_3$H$_6$NH$_2$. To a 15 mL vial, ca. 3.0 g of cyclic —SiMe$_2$OSiMe$_2$C$_3$H$_6$NH— was added and stirred vigorously. 0.8 g of EtOH was added to the vial over 12 minutes. The vial was stirred for 3 days to convert 90+% the cyclic siloxazane to the EtO-SiMe$_2$OSiMe$_2$C$_3$H$_6$NH$_2$.

In this Working Example IV, multiple sources of cyclic —SiMe$_2$OSiMe$_2$C$_3$H$_6$NH— were combined in a solution and converted to MeO—SiMe$_2$OSiMe$_2$C$_3$H$_6$NH$_2$. To a 250 mL, 1-neck flask with a fused-glass thermowell was added 60.0 mL of MeOH. The MeOH was heated to reflux temperature and stirred vigorously. 4 sources of crude cyclic —SiMe$_2$OSiMe$_2$C$_3$H$_6$NH— containing 30% to 90% of the cyclic siloxazane of mass 15.7 g, 16.0 g, 16.2, and 16.6 g were added to the flask over 6 hours. In each case, the solution was discolored. In between each addition a sample was analyzed by GC, which showed that approximately the same impurities were generated after each addition. After the final addition, the resulting solution was stirred at ca. 72° C. for 3 h to make a mixture where the largest component by mass was that was not methanol was MeO—SiMe$_2$OSiMe$_2$C$_3$H$_6$NH$_2$.

In this Working Example V, a terminal amino-functional siloxane was synthesized via condensation reaction using MeO—SiMe$_2$OSiMe$_2$C$_3$H$_6$NH$_2$. To a 250 mL 3-neck round bottom flask, the following materials were charged: silanol end-blocked polydimethylsiloxane with a viscosity of 70 mPa·s at 25° C. measured according to the test method below (148.7 g) and MeO—SiMe$_2$OSiMe$_2$C$_3$H$_6$NH$_2$ (1.78-2 g). The resulting mixture was heated to 90° C. for 10 minutes under a nitrogen sweep. After 10 min, propionic acid (0.76 g to 1.02 g) was added, and the resulting mixture was stirred at 90° C. for 2 h to 3 h. The distillation vacuum was then applied at the pressure <20 mmHg for 210 min to drive the reaction forward as indicated by an increase in viscosity over time. Excess propionic acid was then removed by stripping at the temperature range from 100° C. to 150° C. depending upon the vacuum pressure and stripping time. Upon completion, the resulting fluid was cooled to RT and purged with nitrogen before storing. This fluid appeared clear and colorless and was an amino-functional polydimethylsiloxane copolymer with dimethyl-propylamine end capping. The copolymer had a viscosity of 2500 mPa·s to 4000 mPa·s at 25° C. measured according to the test method below, and a transmittance of 100% with reference to water. The copolymer was stable for 4 months after aging at 45° C. as evidenced by no ammonia odor being detected after aging.

In this Working Example VI, bis-aminopropyl poly-dimethylsiloxane with Mw 1,400 g/mol and DP=16 was synthesized as follows. To a 250 mL 3-neck round bottom flask with a thermocouple, magnetic stir bar, and a condenser with a gas adaptor was added ca. 100 g (0.1 mol) of bis-silanol-terminated polydimethylsiloxane (average Mw 1,000 g/mol) (OH-PDMS 2). The flask was continuously purged with N$_2$ and the OH-PDMS 2 was stirred vigorously. The flask was then heated to ca. 64° C. at which time 39.16 g (0.207 mol) of 1,1,3,3-tetramethyl-2-oxa-7-aza-1,3-disilacycloheptane (cyclic —SiMe$_2$OSiMe$_2$C$_3$H$_6$NH—) was added over 10 minutes. The reaction mixture in the flask heated up to a maximum temperature of ca. 74° C. and then began to cool. The applied heat was increased so that the reaction mixture was held at 75° C. and stirred for 30 minutes. The heat was then stopped, and the reaction mixture was allowed to cool to RT and stir overnight while the headspace was flushed with nitrogen. The composition was confirmed by $^1$H NMR and $^{29}$Si NMR and the liquid had a viscosity of 8 mPa·s to 10 mPa·s.

In this Working Example VII, bis-aminopropyl polydimethylsiloxane with Mw 3,500 g/mol and DP=44 was synthesized at RT, as follows. An apparatus comprising a 250 mL 3-neck round bottom flask with a thermocouple, magnetic stir bar, a condenser with a gas adaptor, and a diamond-tipped ReactIR for in-situ monitoring of the reaction by observing the disappearance of a vibration (measured at 894 cm$^{-1}$) consistent with Si—OH was provided. To the flask was added ca. 104.63 g (33.8 mmol) of bis-silanol-terminated polydimethylsiloxane having average Mw=3,100 g/mol (OH-PDMS 3). The flask was inerted with N$_2$ and the OH-PDMS 3 was stirred vigorously. The RT of the OH-PDMS 3 was measured to be 23.4° C. 13.88 g (73.4 mmol) of 1,1,3,3-tetramethyl-2-oxa-7-aza-1,3-disilacycloheptane was added over 1 minute. The reaction between these starting materials temporarily raised the pot temperature to 29.2° C. over six minutes and then subsequently regressed back to RT. Observations demonstrated that the reaction was effectively complete after 6 hours and $^1$H NMR and $^{29}$Si NMR spectra confirmed this.

In this Reference Example VIII, a general procedure for preparing terminal bis-aminopropyl-terminated polydimethylsiloxane was performed as follows.

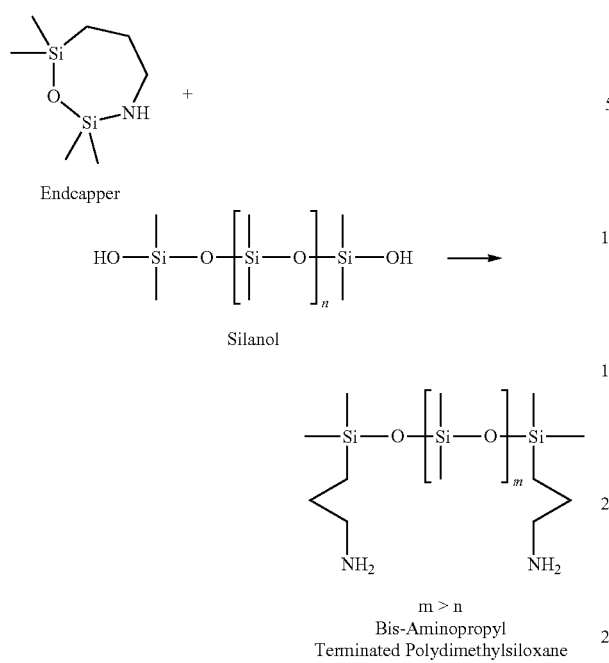

Endcapper

Silanol m > n
Bis-Aminopropyl
Terminated Polydimethylsiloxane

To a 20-mL vial, the following starting materials were charged: a bis-silanol-terminated polydimethylsiloxane and 1,1,3,3-tetramethyl-2-oxa-7-aza-1,3-disilacycloheptane. The resulting mixture was mixed at the reaction temperature until homogeneous. The resulting product was a bis-aminopropyl-terminated polydimethylsiloxane. The reaction progress was monitored using $^{29}$Si-NMR and FTIR. The polymer was stable for 6 months after aging at 45° C. The selection and amount of bis-hydroxy-terminated polydimethylsiloxane (Silanol), the amount of 1,1,3,3-tetramethyl-2-oxa-7-aza-1,3-disilacycloheptane (Endcapper), reaction conditions, and results are shown below in Table X.

In this Reference Example IX, a general procedure for preparing terminal bis-aminopropyl-terminated polydimethylsiloxane via condensation reaction was performed as follows.

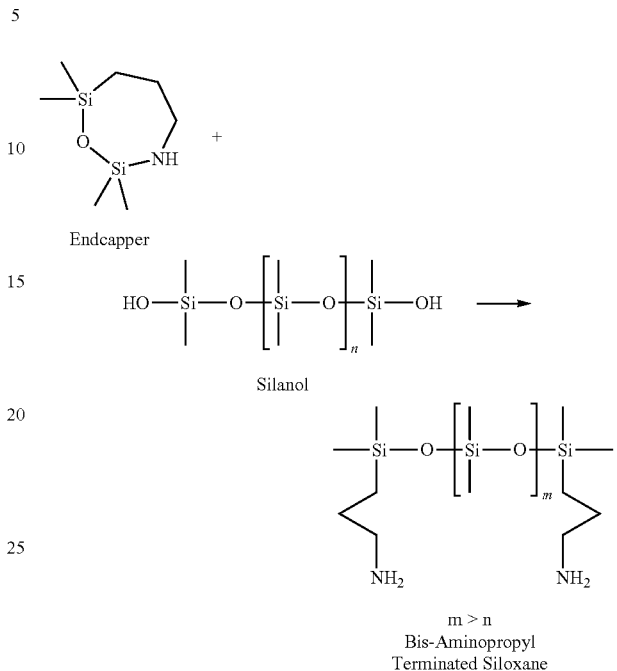

Endcapper

Silanol m > n
Bis-Aminopropyl
Terminated Siloxane

To a 250 mL 3-neck round bottom flask, the following materials were charged: a bis-silanol-terminated polydimethylsiloxane (Silanol) with a viscosity of 70 mPa·s and 1,1,3,3-tetramethyl-2-oxa-7-aza-1,3-disilacycloheptane (Endcapper). The resulting mixture was heated to 90° C. for 10 minutes under a nitrogen sweep. After 10 min, propionic acid was added, and the resulting mixture was continued to stir at 90° C. for 2 h. The distillation vacuum was then

TABLE X

Bis-Aminopropyl-Terminated Polydimethylsiloxanes (Product)
Prepared by the General Procedure of Reference Example VII

| Sample | Silanol viscosity (mPa · s) | wt % Silanol | wt % Endcapper | Reaction temp (° C.) | Reaction time (h) | Product viscosity (mPa · s) | Capping efficiency (%) |
|---|---|---|---|---|---|---|---|
| VII-a | 70-100 | 88.68 | 11.32 | 70 | 6-12 | 70-100 | 100 |
| VII-b | 70-100 | 88.68 | 11.32 | RT | 6-12 | 70-100 | 100 |
| VII-c | 2000-2700 | 98.92 | 1.08 | 60-65 | 6-12 | 2000-2700 | 100 |
| VII-d | 2000-2700 | 98.18 | 1.82 | RT | 3 | 2000-2700 | 80 |
| VII-e | 2000-2700 | 98.18 | 1.82 | RT | 72 | 2000-2700 | 100 |
| VII-f | 2000-2700 | 98.18 | 1.82 | 45 | 3 | 2000-2700 | 70 |
| VII-g | 2000-2700 | 98.18 | 1.82 | 45 | 72 | 2000-2700 | 100 |
| VII-h | 13000-16000 | 99.19 | 0.81 | 60-65 | 6-12 | 13000-16000 | 100 |
| VII-i | 70-100 | 88.18 | 11.82 | 70 | 7 | 70 | 100 |
| VII-j | 70-100 | 88.18 | 11.82 | 90 | 7 | 70 | 100 |
| VI-k | 70-100 | 88.58 | 11.42 | 90 | 3 | 70 | 100 |
| VII-l | 13000-16000 | 99.17 | 0.83 | 90 | 5 | 13000-16000 | 95 |
| VII-m | 2000-2700 | 98.91 | 1.09 | 90 | 6 | 2000-2700 | 70 |
| VII-n | 100-300 | 94.21 | 5.79 | 90 | 4 | 100-300 | 100 |
| VII-o | 70-100 | 88.63 | 11.37 | 90 | 3.5 | 70 | 100 |
| VII-p | 700-800 | 97.77 | 2.23 | 150 | 4 | 700-800 | 100 |
| VII-q | 700-800 | 97.19 | 2.81 | 90 | 10 | 700-800 | 100 |
| VII-r | 2000-2700 | 98.27 | 1.73 | 90 | 11 | 2000-2700 | 100 |
| VII-s | 330000-350000 | 99.69 | 0.31 | 145 | 8 | 340000-360000 | 100 |
| VII-t | 2000-2700 | 98.40 | 1.60 | 110 | 5 | 2000-2700 | 100 |

*capping efficiency was analyzed by $^{29}$Si-NMR applied at the pressure <20 mmHg for 3.5 h to drive the reaction forward as indicated by an increase in viscosity over time. Excess propionic acid was removed by stripping at the temperature range from 100-150° C. depending upon the vacuum pressure and stripping time. Upon the completion, the resulting product was cooled down to room temperature and purged with nitrogen prior to storing. This resulting product was a clear and colorless fluid and was shown to be a bis-aminopropyl-terminated polydimethylsiloxane.

TABLE XI

Bis-Aminopropyl-Terminated Polydimethylsiloxanes (Product) Prepared by the General Procedure of Reference Example IX

| Sample | Silanol viscosity (mPa·s) | wt % Silanol | wt % End-capper | wt % Propionic acid | Product viscosity (mPa·s) | Capping efficiency (%) |
|---|---|---|---|---|---|---|
| IX-a | 70 | 98.32 | 1.18 | 0.5 | 2500-3200 | 90 |
| IX-b | 70 | 98.04 | 1.29 | 0.67 | 3000-4000 | 100 |
| IX-c | 70 | 98.32 | 1.18 | 0.5 | 3000-4000 | 80 |

In this Working Example X, a polyorganosiloxane with both terminal and pendant amino-functional groups was prepared as follows. To a 250 mL 3-neck round bottom flask, the following starting materials were charged: bis-silanol-terminated polydimethylsiloxane (Silanol) with a viscosity of 70 mPa·s (97.1 wt %), 3-Aminopropyldiethoxysilane (1.3 wt %), and 1,1,3,3-tetramethyl-2-oxa-7-aza-1,3-disilacycloheptane (1 wt %) (Endcapper). The resulting mixture was heated to 90° C. for 10 minutes under a nitrogen sweep. After 10 min, propionic acid (0.6 wt %) was added, and the resulting mixture was continued to stir at 90° C. for 2 h. The distillation vacuum was then applied at the pressure <20 mmHg for 3.5 h to 4 h to drive the reaction forward as indicated by an increase in viscosity over time. Excess propionic acid was removed by stripping at the temperature range from 100° C. to 150° C. depending upon the vacuum pressure and stripping time. Upon the completion, the product was cool down to room temperature and purged with nitrogen prior to storing. The resulting clear and colorless fluid was an aminopropyl-terminated, aminopropyl-functional polydimethylsiloxane copolymer with a final viscosity of 1800 mPa·s to 2200 mPa·s.

In this Example XI, 1,3-bis(3-aminopropyl)-1,3-dimethyl-1,3-diphenyldisiloxane was synthesized as follows. A 250 mL 3-neck round bottom flask was charged with 21.52 g of a phenyl-methylsiloxane containing principally 1,3-dimethyl-1,3-diphenyl-disiloxane-1,3-diol. This was heated to 90° C. under a nitrogen sweep with mixing. When 90° C. was reached, the flask was charged with 53.27 g of 1,1,3,3-tetramethyl-2-oxa-7-aza-1,3-disilacycloheptane. The mixture was stirred at 300 RPM at 90° C. for 7 h. Reaction was monitored via proton NMR and consumption of the SiOH was monitored by $^{29}$Si NMR.

In this Example XII, ammonia concentration in the samples prepared according to Reference Example VIII above was analyzed, as follows. A bis-aminopropyl-terminated polydimethylsiloxane prepared according to Reference Example VIII was aged for 6 months either in a 45° C. oven or at RT. Hydrion™ CAT #AM-40 paper was used to quantify the concentration of ammonia gas present in the headspace of the container for each sample. The final $NH_3$ concentration heavily depended on the amount of excess 1,1,3,3-tetramethyl-2-oxa-7-aza-1,3-disilacycloheptane added to the reaction, and it was found that a larger excess lead to a more distinct $NH_3$ odor. Sample preparation conditions and aging conditions for the bis-aminopropyl-terminated polydimethylsiloxane product are shown below in the Table.

TABLE

Concentration of Headspace $NH_3$ in TAS

| | Ambient Temperature | | 45° C. | |
|---|---|---|---|---|
| Example | Initial $NH_3$ Concentration (ppm) | Final $NH_3$ Concentration (ppm) | Initial $NH_3$ Concentration (ppm) | Final $NH_3$ Concentration (ppm) |
| VII-i | 0 | 5 | 0 | 0 |
| VII-j | 0 | 5 | 0 | 0 |
| VII-l | 0 | 0 | 0 | 0 |

In this Example XIII, viscosity stability of samples prepared according to Reference Example VIII above was analyzed, as follows: A bis-aminopropyl-terminated polydimethylsiloxane prepared according to Reference Example VIII was aged for 6 months either in a 45° C. oven or at RT. Viscosities before and after aging were measured as described below. Results are shown below in the Table. The viscosities of the bis-aminopropyl-terminated polydimethylsiloxane remained stable over the course of six months at ambient and elevated temperatures (45° C.).

Viscosity of TAS Polymers over 6 Months

| | Ambient Temperature | | 45° C. | |
|---|---|---|---|---|
| Example | Initial Viscosity (mPa·s) | Final viscosity (mPa·s) | Initial Viscosity (mPa·s) | Final viscosity (mPa·s) |
| VIII-i | 64 | 65 | 64 | 66 |
| VIII-j | 64 | 66 | 64 | 68 |
| VIII-c | 2236 | 2267 | 2236 | 2582 |

In this Example XIV, a terminal amino-functional polydiorganosiloxane prepared as described above can be analyzed for reducing hair friction by conditioning hair, as follows. Preparation of Hair Conditioner Formulations (Prophetic) [0099] a polydiorganosiloxane with terminal amino-functional groups (TAS) and a viscosity of 2000 to 2700 mPa·s and 13,000-16,000 mPa·s will be added to rinse-off conditioning formulations using an amount sufficient to provide 1% of the polydiorganosiloxane with terminal amino-functional groups. The conditioning formulations are shown in Table below. The conditioning formulations will be prepared using TAS (2000-2700 mPa·s). DOWSIL™ 2-8566 Amino Fluid and Pantene Smooth & Sleek will be used as a comparative studies.

TABLE I

| | Rinse-off conditioning formulations | | | |
|---|---|---|---|---|
| Ingredient | Control (no TAS) Weight % | TAS (2000-2700 mPa · s) Weight % | TAS (13,000-16,000 mPa · s) Weight % | DOWSIL ™ 2-8566 Weight % |
| Deionized water | 95.8 | 95.8 | 95.8 | 95.8 |
| Hydroxyethyl cellulose[1] | 1.5 | 1.5 | 1.5 | 1.5 |
| Tetrasodium EDTA[2] | 0.2 | 0.2 | 0.2 | 0.2 |
| Cetearyl alcohol[3] | 1.0 | 1.0 | 1.0 | 1.0 |
| PEG-100 Stearate & Glyceryl stearate[4] | 1.0 | 1.0 | 1.0 | 1.0 |
| TAS | 0 | 1.0 | 1.0 | 1.0 |
| Phenoxyethanol and ethyhexylglycerin[5] | 0.5 | 0.5 | 0.5 | 0.5 |

[1] CELLOSIZE ™ PCG-10 available Dow Chemical
[2] VERSENE ™ 220 available Dow Chemical
[3] Crodacol ™ CS50 available from Croda
[4] Arlacel ™ 165 available from Croda
[5] Control contains no silicone block copolymer
6. NEOLONE ™ PE available from Dow Chemical
7. DOWSIL ™ 2-8566 Amino Fluid
Lower number = lower friction = smoother hair surface = better result.
1% Si in the Rinse off conditioner application Deionized water was added to a mixing vessel and heated to 70° C. With moderate agitation, the hydroxyethyl cellulose was dispersed until fully dissolved. Heat was decreased to 60° C. and cetearyl alcohol and PEG-100 stearate and glyceryl stearate and silicone block copolymer (if any) were added. The conditioner was mixed for 3 minutes and then tetrasodium EDTA was added and mixed for 3 minutes. When the temperature was below 40° C., the phenoxyethanol and methylisothiazolinone were added. The water loss was compensated for and the resulting formulation was mixed for an additional 5 minutes. The final pH of the conditioner formulations were all approximately 5.

Medium bleached European human hair from International Hair Importers was used for testing the conditioning formulations prepared herein. Each tress weighed 2 grams. Each tress was rinsed for 15 seconds under a stream of 40° C. tap water. Using a pipette, 0.4 grams of a solution containing nine percent of sodium lauryl sulfate was applied and lathered through the tress for 30 seconds. The tress was rinsed for 30 seconds under running water. Excess water was removed from the tress by passing the tress between the index and middle fingers of the hand. The tresses were placed on a tray covered with paper towels and dried overnight. Each tress was hand combed three times with the narrow teeth of an ACE™ comb, and evaluated using INSTRON WET and INSTRON DRY COMBING procedures. INSTRON procedures are standard, recognized, and industrially acceptable protocols, see for example, U.S. Pat. No. 5,389,364 (Feb. 14, 1995), U.S. Pat. No. 5,409,695 (Apr. 25, 1995), U.S. Pat. No. 5,419,627 (May 30, 1995), and U.S. Pat. No. 5,504,149 (Apr. 2, 1996).

For tests involving condition, hair tresses were rinsed with tap water for 30 seconds at 40° C. The test conditioner was applied to the tress in the amount of 0.8 grams, and the tress was stroked for 30 seconds. The tress was rinsed for 30 seconds under tap water at 40° C. Excess water was removed by pulling the tress through the index and middle fingers of the hand. The tresses were allowed to dry separately on a paper towel overnight at room temperature. The tresses were combed once before performing an INSTRON study. INSTRON COMBING was used for determining conditioning performance by the ease of wet combing and the ease of dry combing. The test employed an INSTRON strain gauge, which was equipped to measure the force required to comb the hair. The conditioning performance was based on the ability of a particular hair treatment formulation, such as a shampoo or a hair conditioner, to reduce the force required to comb the hair with the INSTRON strain gauge. The force was reported as an Average Combing Load (ACL). The lower the number of the ACL value, the better was the conditioning effect imparted by the formulation being tested. According to the INSTRON DRY COMBING method, hair was detangled by combing the tress 3 times. Then hair was retangled by swirling the tress clockwise 3 times and swirling it counter clockwise 3 times. The tress was then placed on a hanger and INSTRON combed. Retangle and Instron combing were repeated until all data points were collected. An average combing force for three tresses was measured for each treatment.

According to the INSTRON WET COMBING method, hair was first wetted by dipping it into distilled water, and then the hair was detangled by combing the tress three times. The tress was then retangled by dipping in distilled water three times. Excess water was removed by passing the tress through the index and middle fingers of the hand twice. The tress was placed on a hanger and INSTRON combed. Retangling and INSTRON combing were repeated until all data points are collected. An average combing force of three tresses was measured for each treatment.

TABLE III

| Dry/wet combing as evaluated by INSTRON | | |
|---|---|---|
| | Average combing Load (kgf) | |
| Sample | Dry | Wet |
| Control | 0.077 | 0.23 |
| TAS (2000-2700 mPa · s) | 0.016 | 0.055 |
| Pantene Smooth & Sleek | 0.017 | 0.022 |
| DOWSIL ™ 2-8566 | 0.016 | 0.091 |

COEFFICIENT OF FRICTION is an industry standard method for measuring reduced frictional properties of treatments on hair and correlates with sensory attributes for smoothness and softness. A Diastron MTT175 tensile tester with 50 g normal force mounted on rubber probe was used for testing in a temperature and humidity controlled room. Three tresses per treatment and 5 measurements per tress were tested to generate the friction data both with and against the hair cuticles. Coefficient of friction (COF)=F/N, where F was the externally applied force and N was the normal force. The same tresses from the combing study were used for measuring the coefficient of friction in the dry state.

The results showed that rinse-off conditioning formulations containing a TAS prepared according to this invention provided an improvement for reduced friction compared to the control conditioner, DOWSIL™ 2-8566, and Pantene Smooth and Sleek.

TABLE

Compare COF with different DP of TAS where higher DP units correlate to higher viscosities.

| Sample | COF with cuticle | COF against cuticle |
|---|---|---|
| Control | 0.33 | 0.54 |
| TAS with DP of 400 and viscosity 2000-2700 mPa·s | 0.12 | 0.26 |
| TAS with DP of 600 and viscosity 13000-16000 mPa·s | 0.093 | 0.15 |

TABLE

Compare COF with comparative studies

| Sample | COF with cuticle | COF against cuticle |
|---|---|---|
| Control | 0.59 | 1.34 |
| TAS 400 | 0.13 | 0.68 |
| Pantene Smooth & Sleek | 0.21 | 0.87 |
| DOWSIL ™ 2-8566 | 0.37 | 0.79 |

In this Example XV, a bis-aminopropyl poly-dimethylsiloxane having Mw=120,500 g/mol and DP=1627 was synthesized by preheating 457 g of ca. 120,000 g/mol silanol terminated polydimethylsiloxane fluid (viscosity ca. 341,000 mPa·s) to 145° C. and then agitating using a mechanical stirrer in a 1 L 3-neck flask with an overhead sweep of nitrogen. 1.60 g of 1,1,3,3-tetramethyl-2-oxa-7-aza-1,3-disilacycloheptane was added to the silanol terminated polydimethylsiloxane fluid and then stirred for 8 hours. The agitation was stopped and the fluid was allowed to cool to ambient temperature and the product was collected. The silanol was shown to be effectively capped to give the 3-aminopropyl-terminated polydimethylsiloxane which was characterized using $^{29}$Si NMR with a cyclodimethyltrisiloxane internal standard. The viscosity of the product was measured at ca. 358,000 mPa·s.

In this Example XVI, a bis-aminopropyl poly-dimethylsiloxane having a viscosity between 20 and 40 MM mPa·s was prepared by combining 99.84 g of a hydroxyl terminated polydimethylsiloxane HO—(Si(CH$_3$)$_2$O)$_n$—Si—OH having a number-averaged molecular weight of 340,000 and a weight-averaged molecular weight of 650,000 as measured by GPC, and a plasticity value within of 55 to 65 according to the method described below (which is commercially available from Dow Silicones Corporation under the tradename XIAMETER™ RBG-0910 Gum) and 0.17 g of 1,1,3,3-tetramethyl-2-oxa-7-aza-1,3-disilacycloheptane in a DAC 500 FVZ SpeedMixer™ cup under a nitrogen atmosphere, and mixed 5 times for 30 seconds, each time at 2350 RPM. The content was allowed to cool for 15 minutes between mixes. After the mixing, the content was placed in a 70° C. oven for 12 hours. The viscosity and plasticity values were similar to the original silanol terminated polydimethylsiloxane. Approximately 25% conversion to the propylamine terminated polydimethylsiloxane was confirmed by diffusion $^{29}$Si NMR.

In this Working Example XVII, a general procedure for preparing bis-(3-amino-2-methyl)propyl-terminated polydimethylsiloxane with an average viscosity of 60 mPa·s to 80 mPa·s and a DP=44 was provided, as follows. An apparatus comprising a 250 mL 3-neck round bottom flask with a thermocouple, magnetic stir bar, a condenser with a gas adaptor was assembled and ca. 50.05 g (16.9 mmol) of bis-silanol-terminated polydimethylsiloxane having a viscosity 60 mPa·s to 80 mPa·s (and DP=40) was added to the flask. The flask was inerted with N$_2$ and the bis-silanol terminated polydimethylsiloxane was stirred vigorously and heated to 90° C. 6.95 g (34.2 mmol) of the product from Working Example 15 in Part I herein, 1,1,3,3,5-pentamethyl-2-oxa-7-aza-1,3-disilacycloheptane (Endcapper), was added to the bis-silanol terminated polydimethylsiloxane. The reaction between these starting materials temporarily raised the pot temperature to 92° C. over three minutes and then subsequently settled back to 90° C. The mixture was stirred for 6 hours and then cooled to RT. The product, bis-(3-amino-2-methyl)propyl-terminated polydimethylsiloxane, was shown to have a DP of 44 based on analysis of $^{29}$Si NMR and had a measured viscosity of 60 mPa·s to 80 mPa·s. The structure was confirmed using $^1$H NMR, $^{13}$C NMR, and $^{29}$Si NMR.

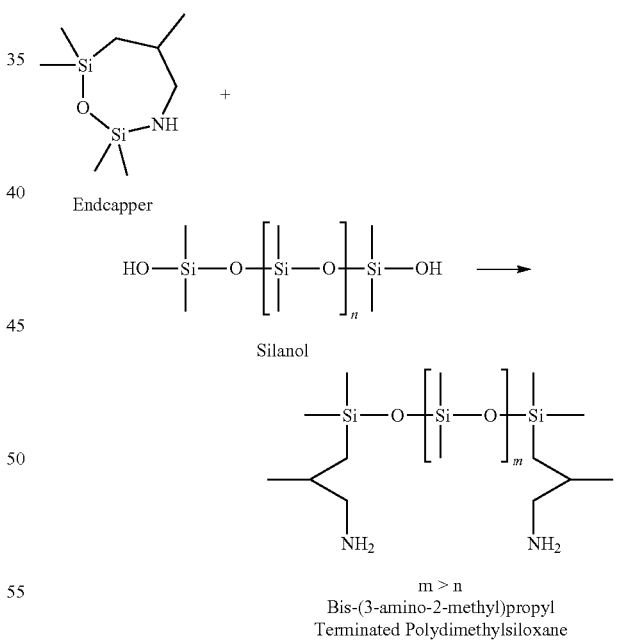

In this Example XVIII, 3-(aminopropyl)-1,1,3,3-tetramethyl disiloxy terminated MQ Resin was synthesized as follows. To a 1,000 mL 3-necked round bottomed flask, the following materials were charged: 148.25 g of MQ 1 resin solution and 45.05 g of HPLC grade xylenes. This mixture was stirred with a PTFE stir paddle attached to a glass stir shaft spinning at 300 RPM. To an addition funnel 38.09 g of cyclic siloxazane was charged and added dropwise into the stirred solution over the course of 20 minutes accompanied by an exothermic temperature increase of +12.2° C. (19.6° C.→31.8° C.). The addition funnel was rinsed with 25 mL of HPLC grade xylenes. The reaction mixture was heated to 80° C. and held at this temperature while stirring for 2 h. Once cooled, 5.28 g 2-propanol and 20.10 g of deionized water were added. A Dean-Stark trap was attached to the reaction apparatus accompanied by a water-cooled reflux condenser. The reaction mixture was heated to a vigorous reflux of xylenes (145° C.) for 20 minutes as water and 2-propanol were collected. After cooling to room temperature under a nitrogen blanket, the reaction product was transferred to a 2 L rotary evaporator flask and stripped to 120° C. at 5 mmHg for 30 min.

The resulting reaction product was analyzed by NMR as follows. 9.24 g of reaction product, 0.1941 g of 1,4-dioxane (internal standard), and 13.8670 g d-chloroform containing Cr(acac)$_3$ at 0.04 M concentration were combined in a PTFE NMR tube and subjected to both $^{29}$Si and $^{13}$C NMR, revealing an average composition of $M^{Me3+NH2}_{0.432}$ $D^{Me2}_{0.109}(Q_{0.459})OH_{0.023}$ where the subscripts represent mole fractions, and an amine hydrogen equivalent weight of 545.8 g/mol NH on a solids basis.

In this Example XIX, 3-(aminopropyl)-1,1,3,3-tetramethyl disiloxy terminated T-Phenyl Resin was synthesized as follows. To a 1,000 mL 3-necked round bottomed flask, the following starting materials were charged: 100.04 g of hydroxyl-functional polyphenylsilsesquioxane (commercially available as DOWSIL™ 217 Resin) and 64.15 g of HPLC grade xylenes. This mixture was stirred with a PTFE stir paddle attached to a glass stir shaft spinning at 300 RPM. The reaction mixture was heated to 50° C. 37.39 g of cyclic siloxazane were added to the stirred solution dropwise over the course of 3 min, resulting in an exothermic temperature increase of +18.3° C. (52.7° C.→71.0° C.). The addition funnel was rinsed with 20 mL of HPLC grade xylenes and charged with 23.66 g of hexamethyldisilazane (commercially available as DOWSIL™ Z-6079 Fluid). Hexamethyldisilazane (HMDZ) was added over the course of 2 min, with no exothermic temperature increase observed. The solution was heated to 80° C. and maintained at this temperature for 4 hours. After cooling, 20.07 grams of HPLC grade 2-propanol and 5.03 grams of deionized water were added to quench any unreacted silazanes and/or siloxazanes. A Dean-Stark trap was attached to the reaction apparatus accompanied by a water-cooled reflux condenser. The reaction mixture was heated to a vigorous reflux of xylenes (145° C.) for 30 min as water and 2-propanol were collected. After cooling to RT under a nitrogen blanket, the reaction product was transferred to a 2 L rotary evaporator flask and stripped to 120° C. at 5 mmHg. To re-disperse the product, 23.96 g of HPLC grade xylenes were added to produce an 85% solution.

4.0977 g of reaction product, 0.1136 g of 1,4-dioxane (internal standard), and 5.7538 g of d-chloroform containing Cr(acac)$_3$ at 0.04 M concentration were combined in a PTFE NMR tube and subjected to both $^{29}$Si and $^{13}$C NMR, revealing an average composition of $M^{Me3+NH2}_{0.221}D_{0.146}$ $(T^{Ph}_{0.634})OH_{0.027}$ and an amine hydrogen equivalent weight of 326.3 g/mol NH on a solids basis.

In this Example XX, 1,1,1-triethyl-3,3,5,5-tetramethyl-5-(3-aminopropyl)-trisiloxane was synthesized as follows, 1.0218 g (5.39 mmol) of 1,1,3,3-tetramethyl-2-oxa-7-aza-1,3-disilacycloheptane was added to a ca. 8 mL vial with a stir bar and mixed at ambient temperature. 0.7136 g (6.14 mmol) of triethylsilanol was added to the vial and stirred the flask exothermed to ca. 37° C. over 15 minutes. The flask cooled over 15 minutes and then the product was analyzed by GC-FID, GC-MS and $^1$H and $^{13}$C NMR that showed 90+% of the cyclic siloxazane had been converted with the major product being identified as $Et_3SiOSiMe_2OSiMe_2C_3H_6NH_2$.

In this Example XXI, 1,1,1-triisopropyl-3,3,5,5-tetramethyl-5-(3-aminopropyl)-trisiloxane was synthesized as follows, 0.9770 g (5.16 mmol) of 1,1,3,3-tetramethyl-2-oxa-7-aza-1,3-disilacycloheptane was added to a ca. 8 mL vial with a stir bar and mixed at ambient temperature. 0.9030 g (5.16 mmol) of tri-isopropylsilanol was added to the vial and stirred 16 days to show that 90+% had been converted to $iPr_3SiOSiMe_2OSiMe_2C_3H_6NH_2$. the product was analyzed by GC-FID, GC-MS and $^1$H and $^{13}$C NMR.

INDUSTRIAL APPLICABILITY

The working examples (W) above showed that cyclic siloxazanes can be prepared efficiently by the process described herein. The cyclic siloxazanes can be used as capping agents for silanol-functional organosilicon compounds including silanol-functional polyorganosiloxanes, such as silanol-terminated polydiorganosiloxanes. Polydiorganosiloxanes with terminal amino-functional groups can be prepared, and these polydiorganosiloxanes may have improved stability over amino-functional siloxanes prepared by conventional methods (e.g., as disclosed in U.S. Pat. No. 7,238,768) as evidenced by, for example, Example XII described above, showing aminopropyl-terminated polydimethylsiloxanes prepared as described herein have low ammonia concentration after aging both at RT and 45° C., and Example XIII showing that viscosity of aminopropyl-terminated polydimethylsiloxanes prepared as described herein remains constant after aging both at RT and 45° C.

DEFINITIONS AND USAGE OF TERMS

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 8.

TABLE 8

| Abbreviations | |
|---|---|
| Abbreviation | Definition |
| acac | acetylacetate |
| ° C. | deqrees Celsius |
| cm | centimeters |
| DP | deqree of polymerization |
| D unit | a siloxane unit of formula (Me$_2$SiO$_{2/2}$) |
| D$^{Vi}$ unit | a siloxane unit of formula (MeViSiO$_{2/2}$) |
| Et | ethyl |
| FTIR | Fourier Transform Infra Red |
| g | grams |
| GC | gas chromatoqraph |
| g/mol | grams per mole |

TABLE 8-continued

Abbreviations

| Abbreviation | Definition |
|---|---|
| GPC | gel permeation chromatoqraphy |
| h | hours |
| in Hq | inches of mercury |
| L | liters |
| M | molar |
| Me | methyl |
| mL | milliliters |
| $M^{Me3+NH2}$ unit | a siloxane unit of formula ([NH$_2$CH$_2$CH$_2$CH$_2$]Me$_2$SiO$_{1/2}$) |
| min | minutes |
| mL | milliliters |
| mmHg | millimeters of mercury |
| mmol | millimoles |
| Mn | number average molecular weight measured by GPC |
| mPa · s | milliPascal · seconds |
| $M^{Vi}$ unit | a siloxane unit of formula (Me$_2$ViSiO$_{1/2}$) |
| Mw | weight average molecular weight measured by GPC |
| NMR | nuclear magnetic resonance |
| Ph | phenyl |
| PTFE | polytetrafluoroethylene |
| Q unit | a siloxane unit of formula (SiO$_{4/2}$) |
| RPM | revolutions per minute |
| RT | ambient room temperature of 20° C. to 25° C. |
| (SiMeViO)$_4$ | tetramethyltetravinylcyclotetrasiloxane |
| TMDSO | 1,1,3,3-tetramethyldisiloxane |
| $T^{Ph}$ unit | a siloxane unit of formula (PhSiO$_{3/2}$) |
| Vi | vinyl |

The following test methods were used to measure properties of the starting materials herein.

Viscosity of each polydiorganosiloxane having viscosities up to 250,000 mPa·s (such as bis-hydroxyl-terminated polydiorganosiloxanes for starting material D-II) and/or amino-functional polydiorganosiloxanes prepared therewith) was measured at 0.1 to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity.

The Williams plasticity number of any polyorganosiloxane considered as a gum may be determined by the American Society for Testing and Materials (ASTM) test method 926D as described in U.S. Pat. No. 8,877,293 B2.

$^{29}$Si NMR and $^{13}$C NMR spectroscopy can be used to quantify the hydrocarbon group (e.g., R group, such as R$^8$ and/or R$^9$ described above) content in a polydiorganosiloxane. A $^{29}$Si NMR spectrum should be acquired using the methodology outlined by Taylor et. al. in Chapter 12 of *The Analytical Chemistry of Silicones*, ed. A. Lee Smith, Vol. 112 in Chemical Analysis, John Wiley & Sons, Inc. (1991), pages 347-417, and section 5.5.3.1. In this chapter, the authors discuss general parameters unique to acquiring quantitative NMR spectra from Silicon nuclei. Each NMR spectrometer is different with respect to the electronic components, capabilities, sensitivity, frequency and operating procedures. One should consult instrument manuals for the spectrometer to be used in order to tune, shim and calibrate a pulse sequences sufficient for quantitative 1D measurement of $^{29}$Si and $^{13}$C nuclei in a sample.

A key output of a NMR analysis is the NMR spectrum. Without standards, it is recommended that the signal to noise ratio of signal height to average baseline noise be no less than 10:1 to be considered quantitative. A properly acquired and processed NMR spectrum results in signals that can be integrated using any commercially available NMR processing software package.

From these integrations, the weight percent of total R group content can be calculated from the $^{29}$Si NMR spectrum according to the following: $(I^M) \cdot (U^M) = G^M$; $(I^{M(R)}) \cdot (U^{M(R)}) = G^{M(R)}$; $(I^D) \cdot (U^D) = G^D$; $(I^{D(R)}) \cdot (U^{D(R)}) = G^{D(R)}$; $U^R/U^{M(R)} = Y^{R'}$; $U^R/U^{D(R)} = Y^{R''}$; $Y^{R''} \cdot [G^{M(R)}/(G^M + G^{M(R)} + G^D + G^{D(R)}) \cdot 100] = W^{R'}$; $Y^{R'''} \cdot [G^{D(R)}/(G^M + G^{M(R)} + G^D + G^{D(R)}) \cdot 100] = W^{R''}$; and $W^{R'} + W^{R''} = \text{TOTAL } W^R$; where I is the integrated signal of the indicated siloxy group; U is the unit molecular weight of the indicated siloxy group; G is a placeholder representing the grams unit; W is the weight percent of the indicated siloxy unit; Y is a ratio value for the specified siloxy unit; R is as described above; R' represents R groups only from M(R); and R" represents R groups only from D(R) groups.

1H-NMR and $^{195}$Pt NMR were evaluated using the following instrument and solvent: a Varian 400 MHz Mercury spectrometer is used. C6D6 is used as the solvent.

Gas Chromatography-Flame Ionization Detector (GC-FID) conditions: a capillary column with 30 meters length, 0.32 mm inner diameter, and containing a 0.25 μm thick stationary phase in the form of a coating on the inner surface of the capillary column, wherein the stationary phase was composed of phenyl methyl siloxane. Carrier gas is helium gas used at a flow rate of 105 mL per minute. GC instrument is an Agilent model 7890A gas chromatograph. Inlet temperature is 200° C. GC experiment temperature profile consist of soaking (holding) at 50° C. for 2 minutes, ramping temperature up at a rate of 15° C./minute to 250° C., and then soaking (holding) at 250° C. for 10 minutes.

GC-MS instrument and conditions: Sample is analyzed by electron impact ionization and chemical ionization gas chromatography-mass spectrometry (EI GC-MS and CI GC-MS). Agilent 6890 GC conditions include a DB-1 column with 30 meters (m)×0.25 millimeter (mm)×0.50 micrometer (μm) film configuration, an inlet temperature of 200° C., an oven program of soaking at 50° C. for 2 minutes, ramping at 15° C./minute to 250° C., and soaking at 250° C. for 10 minutes. Helium carrier gas flowing at constant flow of at 1 mL/minute and a 50:1 split injection. Agilent 5973 MSD conditions include a MS scan range from 15 to 800 Daltons, an EI ionization and CI ionization using a custom CI gas mix of 5% NH$_3$ and 95% CH$_4$.

Number average molecular weight of polyorganosiloxane starting materials (e.g., starting material D), and the amino-functional polyorganosiloxane product described herein) may be measured by GPC according to the test method in U.S. Pat. No. 9,593,209, Reference Example 1 at col. 31. Transmittance of the amino-functional polydimethylsiloxanes prepared in the examples described above was measured with reference to water using a Spectronic 21: Milton Roy.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and/or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18" may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

The invention claimed is:

1. A process for preparing a cyclic siloxazane comprising:
   1) Combining starting materials comprising
      a) an allyl-functional amine,
      b) a platinum catalyst capable of catalyzing hydrosilylation reaction,
      c) a hydrosilylation reaction promoter of formula

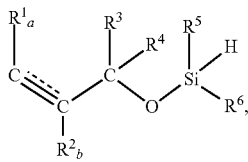

where ----- represents a bond selected from the group consisting of a double bond and a triple bond, subscript a is 1 or 2, subscript b is 0 or 1, with the provisos that when ----- is a double bond, then a=2 and b=1, and when ----- is a triple bond, then a=1 and b=0; each $R^1$ is independently selected from the group consisting of hydrogen, an alkyl group of 1 to 15 carbon atoms, and an aryl group of 6 to 20 carbon atoms; $R^2$ is selected from the group consisting of hydrogen, an alkyl group of 1 to 15 carbon atoms, and an aryl group of 6 to 20 carbon atoms; $R^3$ is selected from the group consisting of hydrogen, an alkyl group of 1 to 15 carbon atoms, and an aryl group of 6 to 20 carbon atoms, and $R^4$ is selected from the group consisting of hydrogen, an alkyl group of 1 to 15 carbon atoms, and an aryl group of 6 to 20 carbon atoms; $R^5$ is an independently selected monovalent hydrocarbon group of 1 to 15 carbon atoms; and $R^6$ is an independently selected monovalent hydrocarbon group of 1 to 15 carbon atoms;
   thereby forming a reaction mixture, and thereafter
   2) Adding to the reaction mixture:
      d) an SiH-terminated siloxane oligomer of formula

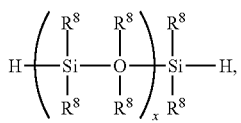

where each $R^8$ is an independently selected monovalent hydrocarbon group of 1 to 18 carbon atoms and subscript x is 1 or 2; thereby preparing the cyclic siloxazane.

2. The process of claim 1, where starting material a), the allyl-functional amine, has formula

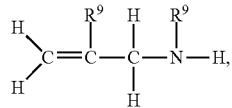

where each $R^9$ is independently selected from the group consisting of hydrogen and an alkyl group of 1 to 15 carbon atoms.

3. The process of claim 2, where the allyl-functional amine is selected from the group consisting of 2-methylallylamine and allylamine.

4. The process of claim 1, where starting material c), the promoter, is selected from the group consisting of:

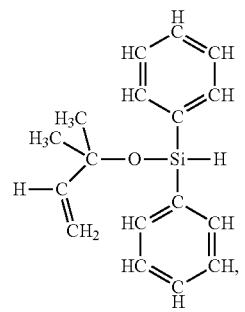

(1,1,-dimethyl-2-propenyl)oxydiphenylsilane

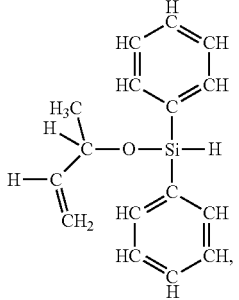

(1-methyl-2-propenyl)oxydiphenylsilane

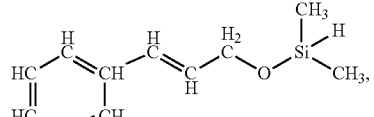

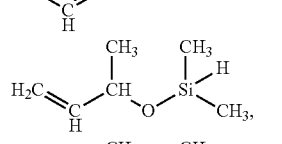

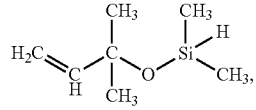

-continued

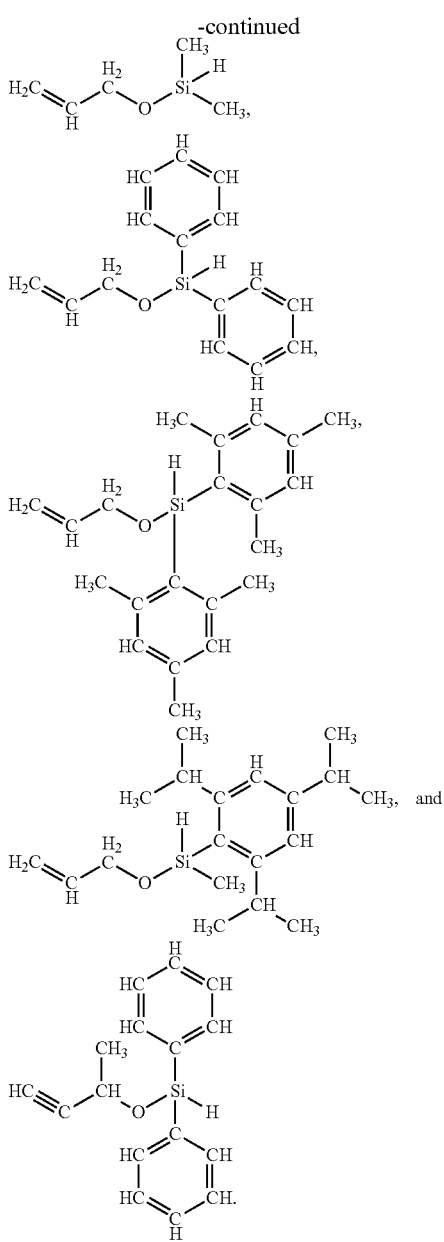

5. The process of claim 1, where starting material d), the SiH-terminated siloxane oligomer, is selected from the group consisting of 1,1,3,3-tetramethyldisiloxane and 1,1,3,3,5,5-hexamethyltrisiloxane.

6. The process of claim 5, where the SiH-terminated siloxane oligomer is 1,1,3,3-tetramethyldisiloxane, and the cyclic siloxazane has general formula:

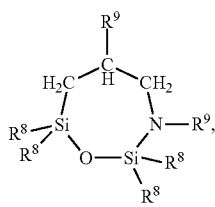

where each $R^8$ is methyl; and each $R^9$ is independently selected from the group consisting of hydrogen and an alkyl group of 1 to 15 carbon atoms carbon atoms.

7. The process of claim 6, where the cyclic siloxazane is selected from the group consisting of:

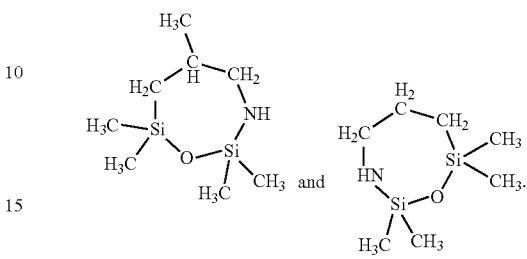

8. The process of claim 5, where the SiH-terminated siloxane oligomer is 1,1,3,3,5,5-hexamethyltrisiloxane, and the cyclic siloxazane has general formula:

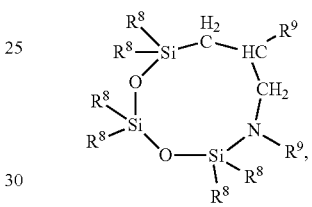

where each $R^8$ is methyl; and each $R^9$ is independently selected from the group consisting of hydrogen and an alkyl group of 1 to 15 carbon atoms carbon atoms.

9. The process of claim 1, where starting material e), a solvent, is added during and/or after step 1).

10. The process of claim 1, where combining in step 1) is performed by mixing starting materials a), b), and c); and heating the reaction mixture to a temperature up to 110° C.

11. The process of claim 1, where starting material b), the platinum catalyst, and starting material c), the hydrosilylation reaction promoter, are combined before combining starting material a), the allyl-functional amine.

12. The process of claim 1, where step 2) is performed at a temperature of 20° C. to 200° C.

13. A process for preparing an amino-functional organosilicon compound comprising:
 pre-1) preparing A) a cyclic siloxazane by practicing the process of claim 1;
 1) Combining starting materials comprising:
  A) the cyclic siloxazane, and
  D) a silanol-functional organosilicon compound; thereby preparing a reaction product comprising the amino-functional organosilicon compound; optionally 2) recovering the amino-functional organosilicon compound; and optionally, before step 2), adding to the reaction mixture E) an acid precatalyst.

14. A process for preparing an α-alkoxy-ω-amino-functional polysiloxane comprising:
 pre-1) preparing A) a cyclic siloxazane by practicing the process of claim 1;
 I) combining starting materials comprising
  A) the cyclic siloxazane, and
  B) an alcohol of formula $R^{10}OH$, where $R^{10}$ is an alkyl group of 1 to 8 carbon atoms;

thereby preparing a reaction product comprising C) the α-alkoxy-ω-amino-functional polysiloxane of formula

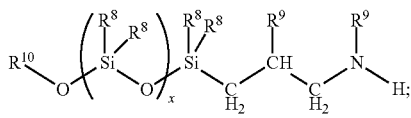

and optionally II) purifying the reaction product to recover C) the α-alkoxy-ω-amino-functional polysiloxane.

15. The process of claim 14, where each $R^8$ is an alkyl group and each $R^9$ is hydrogen.

16. The process of claim 14, where starting material B), the alcohol, is selected from the group consisting of methanol and ethanol.

17. A process for preparing an amino-functional organosilicon compound comprising:
   pre-1) practicing the process of claim 14, thereby preparing the reaction product formed in step I) and/or C) the polysiloxane purified in step II);
   1) Combining starting materials comprising
      the reaction product and/or C) the polysiloxane;
      D) a silanol-functional organosilicon compound;
      thereby preparing a reaction mixture;
   optionally 2) heating the reaction mixture up to 150° C.; and
   optionally 3) adding E) an acid precatalyst to the reaction mixture after step 1) and before step 2), when step 2) is present.

18. The process of claim 17, where starting material D) comprises a silanol-functional polydiorganosiloxane of formula:

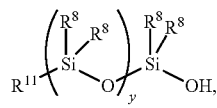

where $R^{11}$ is selected from the group consisting of OH and $R^8$ and subscript y has a value sufficient to provide the silanol-functional polydiorganosiloxane with a viscosity of 8 mPa·s to 100,000,000 mPa·s; alternatively, 8 mPa·s to 40,000,000 mPa·s; alternatively 70 mPa·s to 500,000 mPa·s; and alternatively, 70 mPa·s to 16,000 mPa·s measured at 25° C.

19. The process of claim 18, where the amino-functional organosilicon compound is a primary amino-group-terminated polydiorganosiloxane of formula:

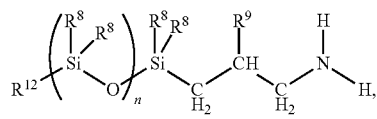

where $R^{12}$ is selected from the group consisting of OH, $R^8$, and $-CH_2CH(R^9)CH_2NH_2$ and subscript n=(X+y+1).

20. The process of claim 17, further comprising: adding F) an aminoalkyl-functional alkoxysilane in step 1); thereby preparing the primary amino-group-terminated polyorganosiloxane which further comprises pendant aminoalkyl-functional groups.

21. The process of claim 17, further comprising: adding G) an endblocker in step 1).

* * * * *